(12) United States Patent
Nishiuchi et al.

(10) Patent No.: US 12,468,267 B2
(45) Date of Patent: Nov. 11, 2025

(54) PROCESS ESTIMATION METHOD AND PROCESS ESTIMATION DEVICE

(71) Applicant: Proterial, Ltd., Tokyo (JP)

(72) Inventors: Takeshi Nishiuchi, Tokyo (JP); Yasuaki Tanioku, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 405 days.

(21) Appl. No.: 18/113,970

(22) Filed: Feb. 24, 2023

(65) Prior Publication Data

US 2023/0280700 A1    Sep. 7, 2023

(30) Foreign Application Priority Data

Mar. 2, 2022    (JP) ................................. 2022-032131
Feb. 10, 2023    (JP) ................................. 2023-019006

(51) Int. Cl.
G05B 13/02        (2006.01)
G05B 19/4155    (2006.01)

(52) U.S. Cl.
CPC ..... *G05B 13/0265* (2013.01); *G05B 19/4155* (2013.01); *G05B 2219/31372* (2013.01)

(58) Field of Classification Search
None
See application file for complete search history.

(56) References Cited

U.S. PATENT DOCUMENTS

2021/0397769 A1    12/2021    Okuno et al.

FOREIGN PATENT DOCUMENTS

WO    WO 2020/090848 A1    5/2020

*Primary Examiner* — Sean Shechtman
(74) *Attorney, Agent, or Firm* — MCGINN I.P. LAW GROUP, PLLC

(57) ABSTRACT

A computer-performed process estimation method and a process estimation method using the computer are provided for estimating, based on a first process data including a process information of a predetermined target step performed in a first manufacturing device that manufactures a material through at least one step including the target step, a second process data including a process information of the target step performed in a second manufacturing device that is a different device from the first manufacturing device and manufactures the material through at least one step including the target step. This method includes machine-learning a relationship between the first process data and a first structure data obtained from a sample after the target step in the first manufacturing device, and creating a first regression model representing a correlation between the first process data and the first structure data, machine-learning a relationship between the second process data and a second structure data obtained from a sample after the target step in the second manufacturing device, and creating a second regression model representing a correlation between the second process data and the second structure data, creating a third regression model representing a correlation between the first process data and the second process data based on the first regression model and the second regression model, and by using the third regression model, estimating an estimated second process data that includes the second process data corresponding to an estimation source-first process data including the first process data that is an arbitrary estimation source.

16 Claims, 18 Drawing Sheets

| MANUFACTURING DEVICE INFORMATION | | COMPOSITION DATA | | | | FIRST PROCESS DATA | | | | | STRUCTURE DATA | | | | | |
|---|---|---|---|---|---|---|---|---|---|---|---|---|---|---|---|---|
| | PRODUCTION LINE NO. | MATERIAL ID | COMPOSITION (mass%) | | ... | OXYGEN CONCENTRATION (%) | TEMPERATURE (°C) | TIME (h) | POST-TREATMENT | ... | $T_C(1)$ (°C) | $T_C(2)$ (°C) | a-AXIS OF MAIN PHASE (nm) | b-AXIS OF MAIN PHASE (nm) | c-AXIS OF MAIN PHASE (nm) | LATTICE VOLUME OF MAIN PHASE (nm³) |
| | | | MATERIAL A | MATERIAL B | | | | | | | | | | | | |
| FACTORY A | 1 | 2022A001 | 10 | 20 | ... | 20 | 1200 | 3 | A | ... | 431.1 | 452.5 | 0.351 | 0.361 | 0.553 | 0.0701 |
| | | | | | | 20 | 1200 | 4 | A | ... | 427.8 | — | 0.351 | 0.362 | 0.552 | 0.0701 |
| | | | | | | 20 | 1200 | 4 | A | ... | 428.0 | — | 0.351 | 0.632 | 0.552 | 0.0701 |
| | | | | | | 20 | 1250 | 3 | B | ... | 418.3 | — | 0.353 | 0.362 | 0.556 | 0.0710 |
| | | | | | | 10 | 1150 | 5 | C | ... | 421.1 | 455.3 | 0.354 | 0.361 | 0.555 | 0.0709 |

413 — MANUFACTURING DEVICE INFORMATION
414 — COMPOSITION DATA
411 — FIRST PROCESS DATA
412 — STRUCTURE DATA

PROCESS ESTIMATION METHOD AND PROCESS ESTIMATION DEVICE

CROSS-REFERENCE TO RELATED APPLICATIONS

The present patent application claims the priority of Japanese patent application No. 2022-032131 filed on Mar. 2, 2022, and the priority of Japanese patent application No. 2023-19006 filed on Feb. 10, 2023, and the entire contents thereof are hereby incorporated by reference, the entire contents of which are incorporated herein by reference.

TECHNICAL FIELD

The present invention relates to a process estimation method and a process estimation device to estimate a process in the manufacturing of a material, more particularly, to a computer-performed process estimation method and a process estimation device using the computer to estimate the process in the manufacturing of the material.

BACKGROUND OF THE INVENTION

In recent years, so-called "Materials Informatics", which uses information science such as data mining to efficiently search for new and alternative materials, has attracted attention. In Japan, material development through so-called "Materials Integration" is also being studied. "Materials Integration" is defined as a comprehensive materials technology tool that aims to support materials research and development by integrating scientific technologies such as theory, experiment, analysis, simulation, and database, into materials science achievements.

For example, Patent Literature 1 discloses a material design device for designing a material to be designed, including a material composed of plural compositions or a material manufactured using a combination of plural manufacturing conditions. This device uses a learned model that is obtained by machine learning and represents correspondence between input information including design conditions of the material to be designed and output information including values of material properties.

Citation List Patent Literature 1: WO 2020/090848

SUMMARY OF THE INVENTION

By the way, development of new materials, etc., is often conducted using a small-scale manufacturing device for research and development, followed by tests using a larger-scale manufacturing device if required, and lastly examining conditions for stable manufacturing by a manufacturing device for mass production in a factory, etc. Therefore, it is necessary to repeat many experiments (test manufacturing) before reaching the point where the mass production can be achieved, hence, there are problems that large amounts of materials are wasted and it takes a lot of time.

To solve these problems, it is necessary to improve reproducibility in manufacturing of a material between different manufacturing devices, in such a manner that, e.g., a new material developed using a small-scale manufacturing device for research and development is reproducibly manufactured by a manufacturing device for mass production. However, for example, the scale of equipment, usage conditions, environment, and degree of deterioration over time, etc., are different between the manufacturing device for research and development and the manufacturing device for mass production, and even in case that the devices used are the same, there are individual differences between the devices. Furthermore, devices using completely different methods, e.g., different heating methods, etc., are used in some cases. For this reason, it has been difficult to achieve reproducible manufacturing of a material such as new material, etc., between different manufacturing devices.

Therefore, it is an object of the invention to provide a process estimation method and a process estimation device with which a material can be reproducibly manufactured even with different manufacturing devices.

To solve the problems described above, one aspect of the invention provides a computer-performed process estimation method for estimating, based on a first process data comprising a process information of a predetermined target step performed in a first manufacturing device configured to manufacture a material through at least one step including the target step, a second process data comprising a process information of the target step performed in a second manufacturing device that is a different device from the first manufacturing device and configured to manufacture the material through at least one step including the target step, the method comprising:

- machine-learning a relationship between the first process data and a first structure data obtained from a sample after the target step in the first manufacturing device, and creating a first regression model representing a correlation between the first process data and the first structure data;
- machine-learning a relationship between the second process data and a second structure data obtained from a sample after the target step in the second manufacturing device, and creating a second regression model representing a correlation between the second process data and the second structure data;
- creating a third regression model representing a correlation between the first process data and the second process data based on the first regression model and the second regression model; and
- by using the third regression model, estimating an estimated second process data that comprises the second process data corresponding to an estimation source-first process data comprising the first process data that is an arbitrary estimation source.

To solve the problems described above, another aspect of the invention provides process estimation device using a computer configured to estimate, based on a first process data comprising a process information of a predetermined target step performed in a first manufacturing device configured to manufacture a material through at least one step including the target step, a second process data comprising a process information of the target step performed in a second manufacturing device that is a different device from the first manufacturing device and configured to manufacture the material through at least one step including the target step, the device comprising:

a first regression model creation processing unit that machine-learns a relationship between the first process data and a first structure data obtained from a sample after the target step in the first manufacturing device, and creates a first regression model representing a correlation between the first process data and the first structure data; a second regression model creation processing unit that machine-learns a relationship between the second process data and a second structure data obtained from a sample after the target step in the second manufacturing device, and creates a second regression model representing a correlation between the second process data and the second structure data;

a third regression model creation processing unit that creates a third regression model representing a correlation between the first process data and the second process data based on the first regression model and the second regression model; and a process estimation processing unit that, by using the third regression model, estimates an estimated second process data that comprises the second process data corresponding to an estimation source-first process data comprising the first process data that is an arbitrary estimation source.

Advantageous Effects of the Invention

According to the invention, it is possible to provide a process estimation method and a process estimation device with which a material can be reproducibly manufactured even with different manufacturing devices.

BRIEF DESCRIPTION OF DRAWINGS

FIG. 4 is a diagram illustrating an example of first training data.

DETAILED DESCRIPTION OF THE INVENTION

Embodiment

An embodiment of the invention will be described below in conjunction with the appended drawings.

Network System

Figure 1:
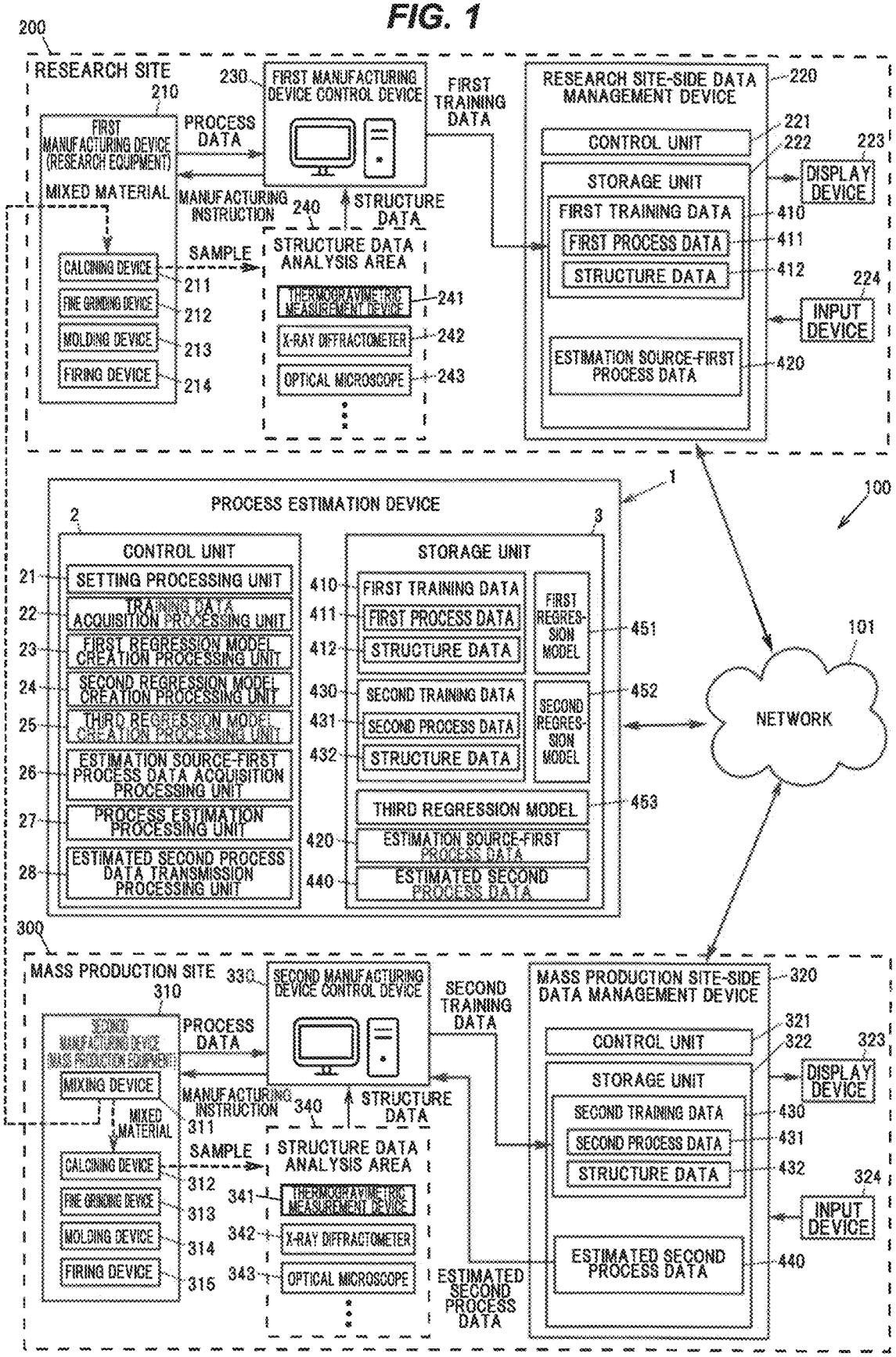
FIG. 1 is a schematic configuration diagram illustrating a network system including a process estimation device in an embodiment of the present invention.

FIG. 1 is a schematic configuration diagram illustrating a network system 100 including a process estimation device (i.e., process prediction device) 1 in an embodiment of the invention. As shown in FIG. 1, the network system 100 is configured in such a manner that a research site-side data management device 220 installed at a research site 200 having a first manufacturing device 210, a mass production site-side data management device 320 installed at a mass production site 300 having a second manufacturing device 310, and the process estimation device 1 are connected through a network 101 so as to be able to intercommunicate with each other. As the network 101, it is possible to use, e.g., Internet or a dedicated intranet, etc.

Material to be Manufactured

In the following description, a case where the material to be manufactured is a ceramic material will be described. In further detail, a case where the ceramic material to be manufactured is a ferrite magnet, which is a magnetic material, will be described in the present embodiment. Ferrite magnets are formed using a metal oxide (iron oxide) or inorganic salt of metal (strontium carbonate), etc., as raw materials (crude materials) and manufactured through a mixing step, a calcination step, a fine grinding step, a molding step, and a sintering step (also called a firing step). Details of each step will be described later.

The material to be manufactured is not limited to a magnetic material such as a ferrite magnet, nor is it limited to a ceramic material. The invention can also be applied to, e.g., composite materials formed using resins or rubbers and used for jackets of electric wires, etc.

Research Site 200

The research site 200 is a research and development site for developing new materials, and has the first manufacturing device 210 that is small-scale research equipment capable of manufacturing a small amount of material (ferrite magnet in this example). New materials, etc., developed at the research site 200 will be mass-produced at the mass production site 300 (described later). The research site 200 has the first manufacturing device 210, a first manufacturing device control device 230 to control the first manufacturing device 210, the research site-side data management device 220, and a structure data analysis area 240.

First Manufacturing Device 210

In the present embodiment, the first manufacturing device 210 is a device to manufacture ferrite magnets, as described above. In more particular, the first manufacturing device 210 includes a calcining device 211 to perform the calcination step, a fine grinding device 212 to perform the fine grinding step, a molding device 213 to perform the molding step, and a sintering device 214 to perform the sintering step. However, the first manufacturing device 210 is not limited to that shown in the drawing as long as it is composed of devices appropriate for the material to be manufactured.

In the present embodiment, the first manufacturing device 210 does not includes a mixing device to perform the mixing step. The first manufacturing device 210 manufactures ferrite magnets using a mixed material mixed by a mixing device 311 of the second manufacturing device 310 that is mass production equipment at the mass production site 300 (described below). This allows the same mixed material to be used in the first and second manufacturing devices 210, 310, thereby achieving higher reproducibility in manufacturing between the first and second manufacturing devices 210, 310.

In the calcining device 211, mixed powder is heated to cause the crude materials to react, thereby obtaining a calcined body having a structure mainly composed of a magnetoplumbite crystalline phase (M phase), which is the main phase of ferrite magnet. In the fine grinding device 212, the calcined body is coarsely ground and then finely ground, thereby obtaining powder mainly composed of particles of typically not less than 1 µm. By reducing the particle diameter of the powder, it is easier to orient the fine powder in the next step of molding in a magnetic field (e.g., magnetic-field assisted compaction) and this makes it easier to increase the residual flux density, and also, the main phase crystal grains of the finished magnet become finer and this makes it easier to enhance magnetic coercivity.

In the molding device 213, the powder obtained in the fine grinding device 212 is placed in a mold and compacted into a compacted powder object. During this process, applying a magnetic field from the outside aligns the orientation (the easy magnetization direction) of individual particles, and high properties can thereby be obtained after sintering. As a molding method in the molding device 213, the following methods are mainly known: "wet compaction" and "wet molding" where a slurry formed by mixing fine powder (ferrite powder) obtained in the fine grinding device 212 with water is introduced into a molding die and is compacted (molded) in an applied magnetic field under applied pressure while draining the water; and "dry molding" (e.g., dry pressing) where fine powder is placed in a mold without adding water and is compacted (molded) in an applied magnetic field under applied pressure. The molding method in the molding device 213 is not specifically limited, but "wet molding" is easier to orient the particles and allows to obtain high magnetic properties. In the sintering device 214, the molded object obtained by the molding device 213 is placed in a sintering furnace and is densified by promoting the reaction with heat. The obtained sintered body is processed into a required shape and size by machining, etc. Ferrite magnets are thereby manufactured.

Structure Data Analysis Area 240 and Structure Data

The research site 200 also has the structure data analysis area 240 to acquire information defining the "structure" of the material and to obtain structure data. The structure data can include information about a proportion of each phase constituting the material, crystal structure, molecular structure, distinction between monocrystalline/polycrystalline/amorphous, shape and size of crystal grains in case of polycrystal, crystal orientation, grain boundaries, type and density of defects such as twinning, stacking fault or dislocation, and segregation of solute elements at grain boundaries and within grains, etc.

In the present embodiment, information about "magnetic phase transition", which is generally and conventionally treated as information defining "properties" of materials (property data), is used as the structure data. That is, the structure data includes a feature amount based on temperature dependence of magnetization in individual materials.

Here, the "feature amount based on temperature dependence of magnetization" will be described. A typical example of the magnetic phase transition is "ferromagnetic-paramagnetic transition". Temperature above which such a magnetic phase transition occurs is called the Curie temperature (Tc), or Curie point. The Curie temperature of material strongly depends on the crystal structure and composition of the phases constituting the material and thus can be used as the structure data. In addition, acquisition of the "feature amount based on temperature dependence of magnetization" is advantageous in that variation in data quality due to the personal skills of the person collecting the data is less likely to occur and it is possible to acquire data mechanically. In this regard, a "feature amount related to the magnetic phase transition" is a feature amount indicating the structural characteristics resulting from the "ferromagnetic-paramagnetic transition" and can be defined by the Curie temperature. In this regard, "ferromagnetic" here is "ferromagnetism" in the broad sense that includes "ferrimagnetism". A feature amount indicating the structural characteristics resulting from "antiferromagnetic-paramagnetic transition" may also be used. Such a feature amount is defined by the Neel temperature. That is, examples of the feature amount based on temperature dependence of magnetization include the feature amount related to the magnetic phase transition, in more particular, at least one of the Curie temperature and the Neel temperature.

Figure 2:
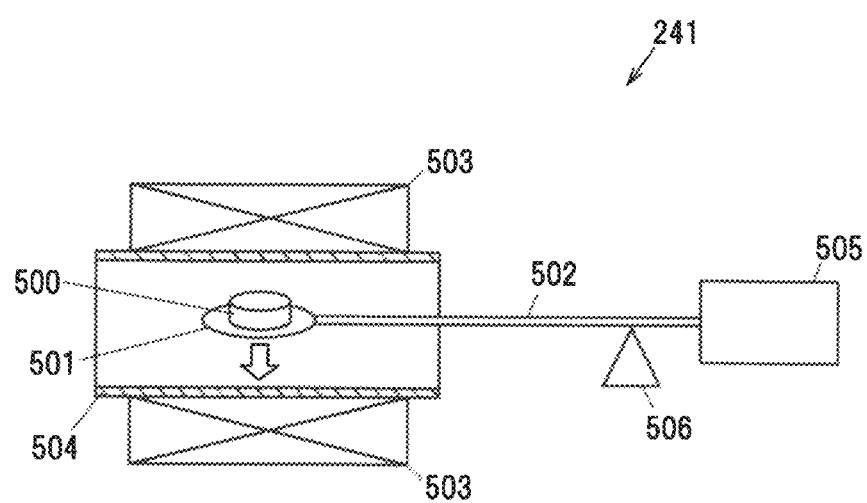
FIG. 2 is an explanatory diagram illustrating a thermogravimetric measurement device.

The Curie temperature should be measured using a thermogravimetric (TG: Thermogravimetry) measurement device 241 capable of simple and high-sensitivity measurement. As shown in FIG. 2, the thermogravimetric measurement device (e.g., thermogravimetric analyzer) 241 includes a beam portion 502 with one end having a holder 501 to hold a sample (measurement sample) 500 placed in a container, an electric furnace 504 having a heater 503 to heat the sample 500, and a weight measurement unit 505 connected to the other end of the beam portion 502 to detect change in weight of the sample 500. The beam portion 502 is supported by a support 506 that acts as a fulcrum.

In the thermogravimetric measurement device 241, the weight measurement unit 505 measures the change in weight associated with reaction such as thermal decomposition that occurs in the sample 500 when the sample 500 is heated. When extracting the feature amount related to the magnetic phase transition, a magnetic field gradient is applied externally to the sample 500 during the measurement. This can exert a magnetic attraction force on the sample 500, as indicated by the white arrow in FIG. 2. As a result, the magnetic attraction force is superimposed on the weight of the sample 500, hence, a "weight" value measured by the weight measurement unit 505 also includes the magnetic attraction force acting on the sample 500. The magnetic attraction force corresponds to the magnitude of the "magnetization" of the sample 500. For this reason, when the phase transition from ferromagnetism to paramagnetism occurs in the sample 500, magnetization of the sample 500 changes rapidly, hence, the phase transition can be detected as a change in "weight" measured by the weight measurement unit 505.

Figure 3A:
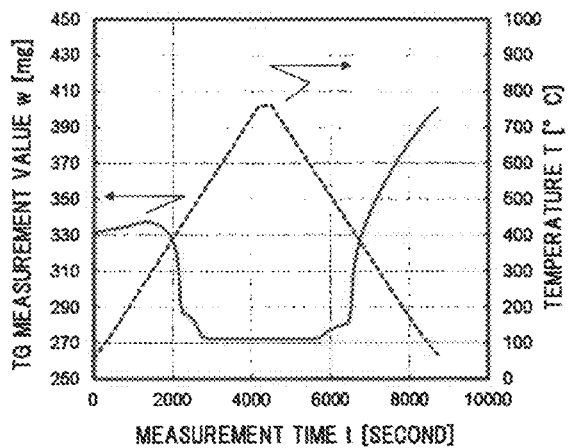
FIG. 3A is an example of a graph showing a temperature profile of the thermogravimetric measurement device (dashed line) and measured value (solid line).

FIG. 3A is an example of a graph showing temperature T of a sample mounting portion (dashed line) and TG measurement value w (solid line) during the measurement by the thermogravimetric measurement device 241. The TG measurement w is a superimposed value of the weight of the sample 500, weight of a container (pan) made of alumina, and the magnetic attraction force. Since the weights of the pan and the sample 500 do not change due to temperature, change in the TG measurement w corresponds to change in magnitude of a magnetic force experienced by the sample 500, i.e., change in the magnitude of the magnetization of the sample 500.

Figure 3B:
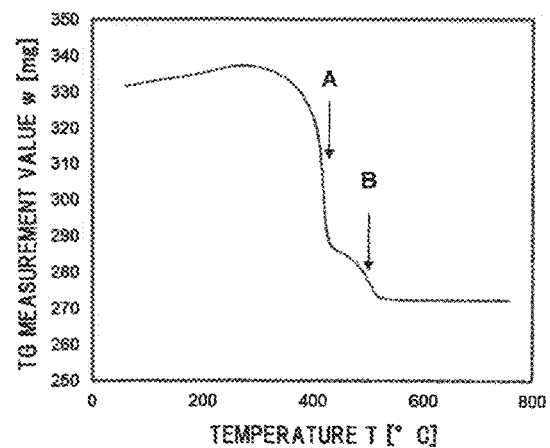
FIG. 3B is a graph showing an example of temperature dependence of TG measurement value based on the measurement data of FIG. 3A.

FIG. 3B is a graph showing temperature dependence of the TG measurement value w based on the measurement data of FIG. 3A. In the graph of FIG. 3B, the TG measurement value w rapidly changes at positions (temperatures) indicated by an arrow A and an arrow B. This rapid change in the TG measurement value (the weight) is caused by the ferromagnetic-paramagnetic transition of the phase (the ferromagnetic phase) in the sample. The amount of change in the TG measurement w (the weight) reflects the magnetization and volume proportion of the ferromagnetic phase in the sample.

Figure 3C:
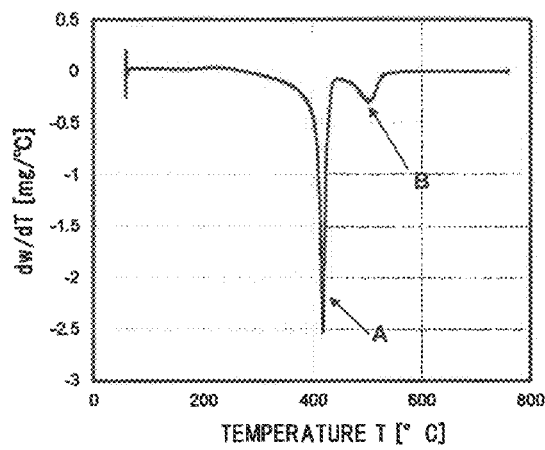
FIG. 3C is a graph showing first-order differentials at temperatures of a curve of the TG measurement value shown in FIG. 3B.

FIG. 3C is a graph showing first-order differentials at the temperatures T of a curve shown in FIG. 3B. In FIG. 3C, an arrow A and an arrow B corresponding to the arrow A and the arrow B in FIG. 3B are shown at the same positions (temperatures). Temperatures exhibiting a local minimum at the positions of the arrow A and the arrow B in FIG. 3C are the Curie temperatures Tc. The Curie temperature Tc may be determined by other methods. However, since the Curie temperature Tc is used as the structure data in machine learning, it is preferable to use the same method for obtaining the Curie temperature Tc.

In the structure data analysis area 240, in addition to the thermogravimetric measurement device 241, e.g., an X-ray diffractometer 242 and an optical microscope 243, etc., may be installed as the devices to analyze the structure data. The X-ray diffractometer 242 is used to determine, e.g., type, proportion or lattice constant, etc., of phases (compounds) present in the material, by the X-ray diffraction (XRD) method. The optical microscope 243 is used to measure, e.g., the size of each phase. However, the devices to analyze the structure data are not limited to those shown in the drawing, and, e.g., a scanning electron microscope (SEM) may be used in place of the optical microscope 243. In addition, the composition of each phase may be determined by, e.g., an energy dispersive X-ray spectroscopy (EDX) attached to the SEM, or an electron probe microanalyzer (EPMA), etc.

Structure data 412 acquired in the structure data analysis area 240 is input to the first manufacturing device control device 230. For example, the structure data analysis area 240 may be configured to include a personal computer for analysis (not shown) so that the structure data 412 is transmitted from the personal computer to the first manufacturing device control device 230. The structure data 412 acquired in the structure data analysis area 240 is input to the first manufacturing device control device 230 in the present embodiment, but may be input directly to the research site-side data management device 220.

Target Step

Although the details will be described later, in the present embodiment, a correlation between first process data 411 including process information of a predetermined target step performed in the first manufacturing device 210 and the structure data 412 after the target step is learned by the process estimation device 1 using machine learning. In case of manufacturing a magnetic material such as ferrite magnet, at least one of the mixing step, the calcination step, the fine grinding step, the molding step, and the sintering step can be selected as the target step. Among these steps, particularly the calcination step and the sintering step cause significant structural changes due to the thermal history of the material. Therefore, when the calcination step or the sintering step is the target step, the effects of the present invention are more likely to become apparent. In the present embodiment, a sample after the calcination step (before the fine grinding step) is collected, and the structure data of the collected sample is acquired in the structure data analysis area 240.

First Manufacturing Device Control Device 230

The first manufacturing device control device 230 is a device to control (alternatively, manage or monitor) the first manufacturing device 210 and is composed of, e.g., a personal computer.

The first manufacturing device control device 230 gives manufacturing instructions to each of the devices 211 to 214 of the first manufacturing device 210 and configures various settings of each of the devices 211 to 214, and also monitors the production status in each of the devices 211 to 214 and performs various data collection, etc., during the production. Although one first manufacturing device control device 230 is provided for the devices 211 to 214 in this example, it is not limited thereto. A dedicated control device may be provided for each of the devices 211 to 214, and it is also possible to configure to allow intercommunication of various data between the dedicated control device and the first manufacturing device control device 230. In addition, data may be exchanged between the first manufacturing device control device 230 and each of the devices 211 to 214 by using a storage medium such as USB memory.

In the present embodiment, since the target step is the calcination step, the first manufacturing device control device 230 acquires the first process data 411, which includes process information (e.g., oxygen concentration, temperature, time, post-treatment method, etc.) of the calcination step, from the first manufacturing device 210. In case that the first manufacturing device control device 230, itself, holds the process information, etc. of the target step (the calcination step in this example) as setting information or manufacturing instruction information, etc., it may be configured to acquire the held information as the first process data 411. In this regard, the process information may be operating conditions that can be set in the first manufacturing device 210, or it may be conditions for control by instruments installed in the first manufacturing device 210.

The structure data 412 acquired in the structure data analysis area 240 is input to the first manufacturing device control device 230. Although the example in which the structure data 412 already processed in the structure data analysis area 240 is input is shown here, it is not limited thereto. The structure data 412 may be generated by inputting raw data (actual measurement data), which is acquired in the structure data analysis area 240, to the first manufacturing device control device 230 and performing data processing on the input raw data (actual measurement data) in the first manufacturing device control device 230. The first manufacturing device control device 230 generates first training data 410 as a database linking the first process data 411 to the corresponding structure data 412, and transmits it to the research site-side data management device 220.

Research Site-Side Data Management Device 220

The research site-side data management device 220 has a control unit 221 that configures various settings and performs data input/output processing, etc., and a storage unit 222. The control unit 221 is realized by appropriately combining a computing element such as a CPU, a memory, an interface, software, and a storage device, etc. The storage unit 222 is realized by a predetermined storage area of the memory or the storage device.

The research site-side data management device 220 is also provided with a display device 223 such as a display and an input device 224 such as a keyboard. The display device 223 may be of a touch panel type and the display device 223 may also serve as the input device 224. Furthermore, the display device 223 and the input device 224 may be configured to wirelessly communicate with the research site-side data management device 220. In this case, the display device 223 and the input device 224 may be composed of, e.g., a smartphone or tablet.

When the control unit 221 receives the first training data 410 from the first manufacturing device control device 230, the control unit 221 stores the first training data 410 in the storage unit 222 and also transmits a first training data update signal, which indicates that the first training data 410 has been updated, to the process estimation device 1 through the network 101. When receiving a first training data request signal from the process estimation device 1, the control unit 221 transmits the first training data 410 to the process estimation device 1. The specific details of the processing at this time will be described later (see First training data transmission processing, FIG. 11).

When estimation source-first process data 420 is input from the input device 224, the control unit 221 stores the estimation source-first process data 420 in the storage unit 222 and also transmits a process estimation request signal to the process estimation device 1. When receiving an estimation source-first process data request signal from the process estimation device 1, the control unit 221 transmits the estimation source-first process data 420 to the process estimation device 1. The specific details of the processing at this time will be described later (see Estimation source-first process data transmission processing, FIG. 15). In this regard, the estimation source-first process data 420 may be input from a device other than the input device 224. In addition, the estimation source-first process data 420 may be selected from the first training data 410 stored in the storage unit 222, by operating the input device 224.

First Training Data 410

FIG. 4 is a diagram illustrating an example of the first training data 410. Note that, FIG. 4 shows a concept of the first training data 410 and does not list actual experimental data. As shown in FIG. 4, the first training data 410 is a database in which at least the first process data 411 and the structure data 412 are associated with each other. In the present embodiment, the first training data 410 includes, in addition to the first process data 411 and the structure data 412, manufacturing device information 413 including information allowing for identification of the first manufacturing device 210, and composition data 414 including information of the composition of the mixed material used.

The manufacturing device information 413 includes information of, e.g., name of factory, etc., and production line No., etc. The manufacturing device information 413 may include various information, e.g., identification number of factory or production line, and model, manufacturer, method, and capacity, etc., of each of the devices 211 to 214 of the first manufacturing device 210, etc. The composition data 414 includes information of material ID to identify the mixed material, and composition of the mixed material, etc. When the target step is the calcination process, the first process data 411 includes information of, e.g., oxygen concentration, temperature, time, post-treatment method, etc. The first process data 411 may include not only process information of the target step (the calcination step in this example), but also information for other steps. The structure data 412 includes information of, e.g., Curie temperatures $T_c(1)$ and $T_c(2)$ corresponding to the arrows A and B in FIG. 3C, length of the a-axis of the main phase, length of the b-axis of the main phase, length of the c-axis of the main phase, and lattice volume of the main phase, etc. In this regard, the illustrated example is merely an example and the items may be appropriately changed according to materials, etc., to be used. In addition, in case of manufacturing, e.g., a resin material, the first training data 410 may include property data.

Mass Production Site 300

The mass production site 300 is, e.g., a factory. The mass production site 300 has the second manufacturing device 310 which is a large-scale mass production equipment to manufacture, e.g., several tens of tons of material per production run. The mass production site 300 has the second manufacturing device 310, a second manufacturing device control device 330 to control the second manufacturing device 310, the mass production site-side data management device 320, and a structure data analysis area 340, in the same manner as the research site 200 described above.

Second Manufacturing Device 310

The second manufacturing device 310 has the mixing device 311 to uniformly mix powder of raw materials, a calcining device 312, a fine grinding device 313, a molding device 314, and a sintering device 315. Regarding the calcining device 312, the fine grinding device 313, the molding device 314, and the sintering device 315, the configurations have been described in the description of the first manufacturing device 210, hence, the explanation therefor will be omitted. In the present embodiment in which the target step is the calcination step, the calcining device 312 to perform the calcination step may have a heating method different from that of the calcining device 211 of the first manufacturing device 210. For example, one calcining device 312 (or 211) may be a gas furnace and the other calcining device 211 (or 312) may be an electric furnace. According to the present embodiment, it is possible to estimate second process data 431 corresponding to the first process data 411 even when the heating methods are different as described above and the parameters used in the process data are completely different.

Structure Data Analysis Area 340

In the structure data analysis area 340, a thermogravimetric measurement device 341, an X-ray diffractometer 342 and an optical microscope 343, etc., are installed as the devices to analyze the structure data, in the same manner as the structure data analysis area 240 of the research site 200 described above. Since the structure data analysis area 340 has basically the same configuration as the structure data analysis area 240 of the research site 200 described above, the detailed description thereof will be omitted. The structure data acquired in the structure data analysis area 340 is input to the second manufacturing device control device 330.

Second Manufacturing Device Control Device 330

The second manufacturing device control device 330 is a device to control (or manage, monitor) the second manufacturing device 310 and is composed of, e.g., a personal computer. The second manufacturing device control device 330 is basically the same device as the first manufacturing device control device 230 in the research site 200.

In the present embodiment, since the target step is the calcination step, the second manufacturing device control device 330 acquires second process data, which includes process information (e.g., oxygen concentration, temperature, time, post-treatment method, etc.) of the calcination step, from the second manufacturing device 310. In case that the second manufacturing device control device 330, itself, holds the process information, etc. of the target step (the calcination step in this example) as setting information or manufacturing instruction information, etc., it may be configured to acquire the held information as the second process data. In this regard, the process information may be operating conditions that can be set in the second manufacturing device 310, or it may be conditions for control by instruments installed in the second manufacturing device 310.

Structure data acquired in the structure data analysis area 340 is input to the second manufacturing device control device 330. The second manufacturing device control device 330 generates second training data 430 as a database linking the second process data 431 to the corresponding structure data 432, and transmits it to the mass production site-side data management device 320.

Mass Production Site-Side Data Management Device 320

The mass production site-side data management device 320 has a control unit 321 that configures various settings and performs data input/output processing, etc., and a storage unit 322. The control unit 321 is realized by appropriately combining a computing element such as a CPU, a memory, an interface, software, and a storage device, etc. The storage unit 322 is realized by a predetermined storage area of the memory or the storage device.

The mass production site-side data management device 320 is also provided with a display device 323 such as a display and an input device 324 such as a keyboard. The display device 323 may be of a touch panel type and the display device 323 may also serve as the input device 324. Furthermore, the display device 323 and the input device 324 may be configured to wirelessly communicate with the mass production site-side data management device 320. In this case, the display device 323 and the input device 324 may be composed of, e.g., a smartphone or tablet.

When the control unit 321 receives the second training data 430 from the second manufacturing device control device 330, the control unit 321 stores the second training data 430 in the storage unit 322 and also transmits a second training data update signal, which indicates that the second training data 430 has been updated, to the process estimation device 1 through the network 101. When receiving a second training data request signal from the process estimation device 1, the control unit 321 transmits the second training data 430 to the process estimation device 1. The specific details of the processing at this time will be described later (see Second training data transmission processing, FIG. 13).

Figure 17:
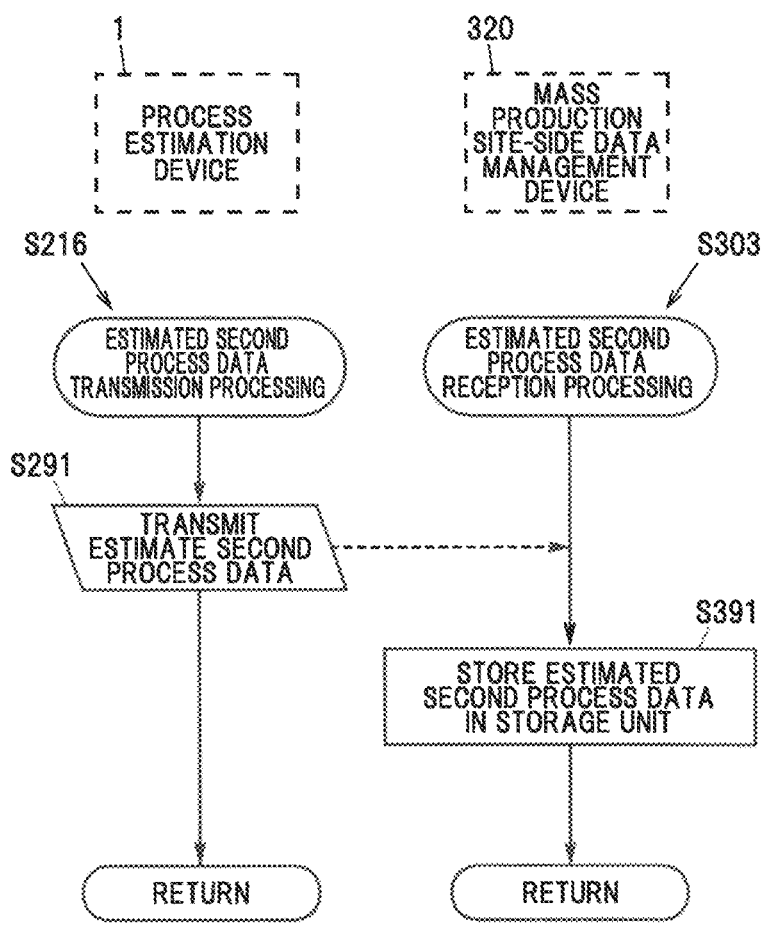
FIG. 17 is a flowchart showing a control flow of estimated second process data transmission processing and estimated second process data reception processing.

When receiving estimated second process data 440 from the process estimation device 1, the control unit 321 stores the estimated second process data 440 in the storage unit 322 (see Estimated second process data reception processing, FIG. 17). Then, the control unit 321 displays the received estimated second process data 440 on the display device 323. The administrator of the second manufacturing device 310 checks the estimated second process data 440 displayed on the display device 323 and sends the estimated second process data 440 to the control unit 330 for second manufacturing device at the time of a mass production test (test manufacturing). Upon the reception of the estimated second process data 440, the control unit 330 for second manufacturing device gives manufacturing instructions according to the estimated second process data 440 to the second manufacturing device 310, and the manufacturing test is then conducted.

Process Estimation Device 1

The process estimation device 1 is, in short, a device that, based on the first process data 411, estimates the corresponding second process data 431. Hereinafter, the first process data 411 which is an estimation source will be referred to as the estimation source-first process data 420, and the second process data 431 obtained by estimation will be referred to as the estimated second process data 440. By using the estimated second process data 440 to carry out manufacturing by the second manufacturing device 310, the material (ferrite magnet in this example) manufactured by the first manufacturing device 210 using the estimation source-first process data 420 can be reproduced and manufactured by the second manufacturing device 310. Next, the details thereof will be described.

The process estimation device 1 is, e.g., a network device such as a server and has a control unit 2 and a storage unit 3. The control unit 2 of the process estimation device 1 is realized by appropriately combining a computing element such as a CPU, a memory, an interface, software, and a storage device, etc. The storage unit 3 is realized by a predetermined storage area of the memory or the storage device.

The control unit 2 has a setting processing unit 21, a training data acquisition processing unit 22, a first regression model creation processing unit 23, a second regression model creation processing unit 24, a third regression model creation processing unit 25, an estimation source-first process data acquisition processing unit 26, a process estimation processing unit 27, and an estimated second process data transmission processing unit 28.

The storage unit 3 stores the first training data 410 received from the research site-side data management device 220 and the second training data 430 received from the mass production site-side data management device 320. The first training data 410 is used for machine learning to create a first regression model 451 by the first regression model creation processing unit 23, and the second training data 430 is used for machine learning to create a second regression model 452 by the second regression model creation processing unit 24. The storage unit 3 stores the first to third regression models 451 to 453 created by the first to third regression model creation processing units 23 to 25. The storage unit 3 also stores the estimation source-first process data 420 received from the research site-side data management device 220 and the estimated second process data 440 obtained by estimation by the process estimation processing unit 27.

Setting Processing Unit 21

The setting processing unit 21 performs setting processing (see FIG. 10) to configure various settings of the process estimation device 1. The setting processing unit 21 can configure settings for information related to various controls, e.g., settings for the method of data acquisition by the training data acquisition processing unit 22 and data acquisition date and time, etc. In addition, the setting processing unit 21 can perform registration, update, deletion, etc., of various information stored in the storage unit 3. For input, etc., of various information, it is possible to use an input device not shown in the drawing, or to use the input device 224 or 324 provided in the research site 200 or the mass production site 300.

Training Data Acquisition Processing Unit 22

Figure 13:
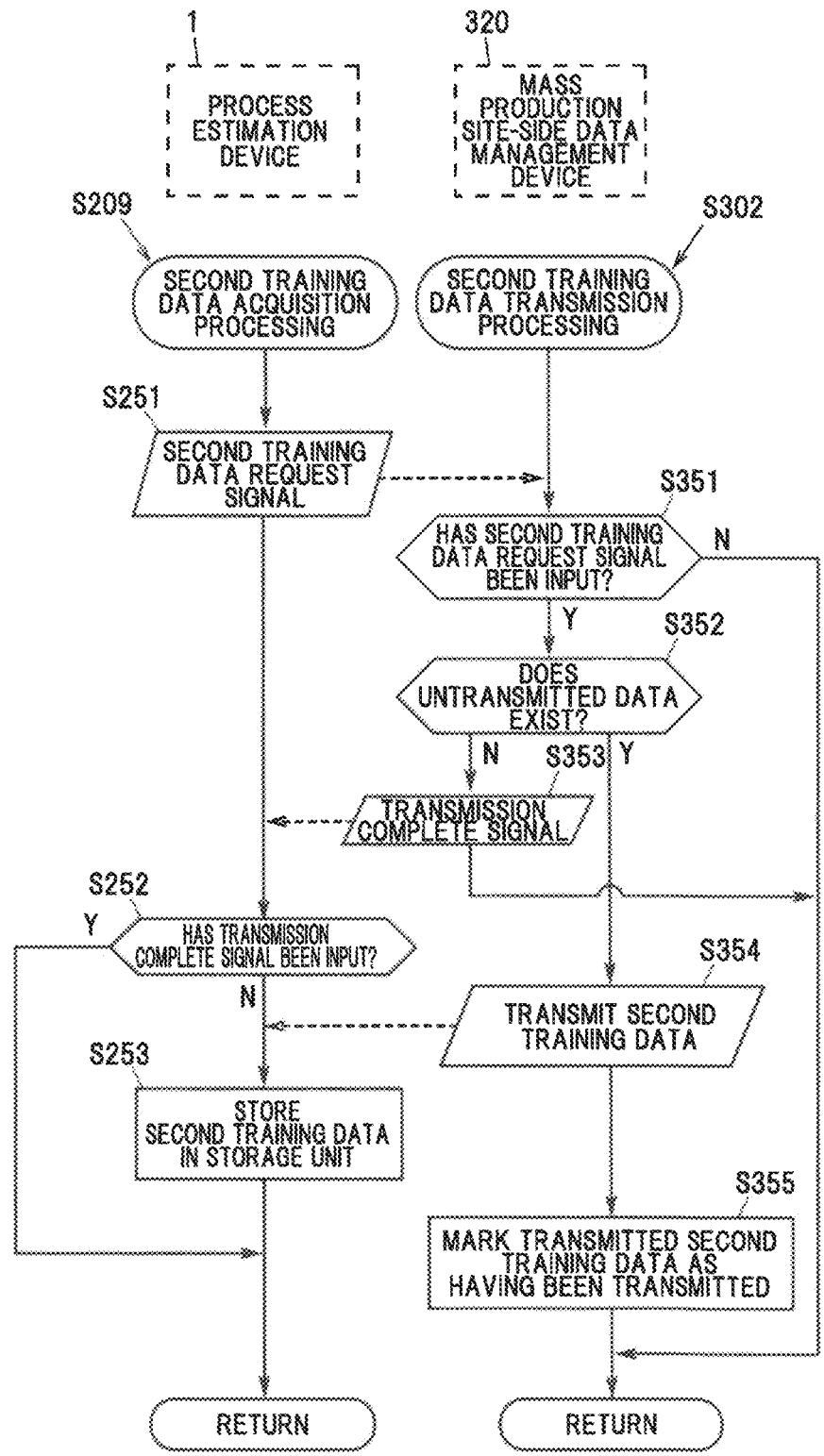
FIG. 13 is a flowchart showing a control flow of second training data acquisition processing and second training data transmission processing.

The training data acquisition processing unit 22 performs first training data acquisition processing to acquire the first training data 410 from the research site-side data management device 220 (see FIG. 11) and second training data acquisition processing to acquire the second training data 430 from the mass production site-side data management device 320 (see FIG. 13).

When receiving a first training data update signal from the research site-side data management device 220, the training data acquisition processing unit 22 performs the first training data acquisition processing. In the first training data acquisition processing, the training data acquisition processing unit 22 transmits a first training data request signal to request the first training data 410 to the research site-side data management device 220, receives the first training data 410 transmitted from the research site-side data management device 220 in response to the request, and stores it in the storage unit 3.

When receiving a second training data update signal from the mass production site-side data management device 320, the training data acquisition processing unit 22 performs the second training data acquisition processing. In the second training data acquisition processing, the training data acquisition processing unit 22 transmits a second training data request signal to request the second training data 430 to the mass production site-side data management device 320, receives the second training data 430 transmitted from the mass production site-side data management device 320 in response to the request, and stores it in the storage unit 3.

First Regression Model Creation Processing Unit 23

The first regression model creation processing unit 23 performs first regression model creation processing (see FIG. 12) to machine-learn a relationship between the first process data 411 and the structure data 412 obtained from a sample after the target step (after the calcination step in this example) based on the manufacturing data of the first manufacturing device 210 and create the first regression model 451 representing a correlation between the first process data 411 and the structure data 412.

Figure 5A:
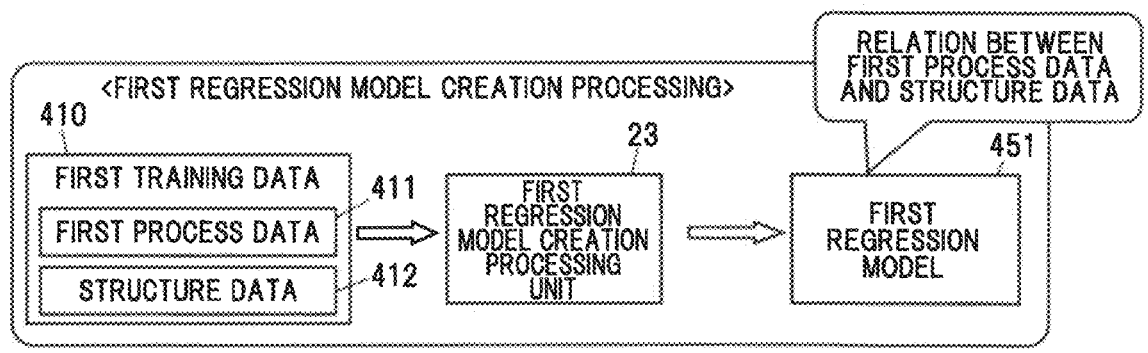
FIGS. 5A to 5D are explanatory diagrams illustrating first to third regression model creation processing and process estimation processing.

As shown in FIG. 5A, in the first regression model creation processing, the first training data 410, which is the past manufacturing data of the first manufacturing device 210, is input to the first regression model creation processing unit 23. The first regression model creation processing unit 23 includes software using learning algorithms, etc., to self-learn the correlation of each parameter (the Curie temperatures $T_c(1)$, $T_c(2)$, etc. Hereinafter referred to as "structure parameter") in the structure data 412 with each parameter (e.g., oxygen concentration, temperature, time, etc. Hereinafter referred to as "process parameter") in the first process data 411 from the first training data 410 by machine learning. The learning algorithm is not specifically limited, and any known learning algorithm can be used and, e.g., so-called deep learning using neural networks with not less than three layers, etc., can be used. What the first regression model creation processing unit 23 learns corresponds to a model structure that represents the correlation between the first process data 411 (i.e., the manufacturing conditions in the first manufacturing device 210) and the structure data 412 after the target step (i.e., the state of the structure of the sample after the target step).

Based on the input first training data 410, the first regression model creation processing unit 23 repeats learning based on a data set including an explanatory variable (the first process data 411) and a criterion variable (the structure data 412) and automatically interprets the correlation between the two. In this regard, the correlation is unknown at the start of learning. However, by gradually interpreting the correlation of the criterion variable (the structure data 412) with the explanatory variable (the first process data 411) as the learning progresses and then using the first regression model 451 which is the resulting learned model, it is possible to interpret the correlation of the criterion variable (the structure data 412) with the explanatory variable (the first process data 411).

The first regression model creation processing unit 23 stores the created first regression model 451 in the storage unit 3. In the present embodiment, the first regression model creation processing unit 23 updates the first regression model 451 each time the first training data 410 is updated. However, it is not limited thereto. For example, the first regression model 451 may be updated at the time of executing process estimation processing (described later), after learning the updated versions of the first training data 410 all together.

Second Regression Model Creation Processing Unit 24

The second regression model creation processing unit 24 performs second regression model creation processing (see FIG. 14) to machine-learn a relationship between the second process data 431 and the structure data 432 obtained from a sample after the target step (after the calcination step in this example) based on the past manufacturing data of the second manufacturing device 310 and creates the second regression model 452 representing a correlation between the second process data 431 and the structure data 432.

Figure 5B:
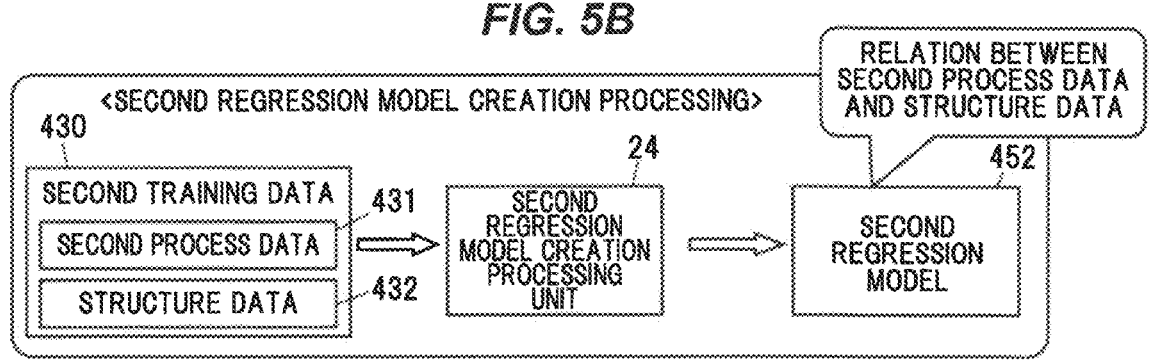

As shown in FIG. 5B, in the second regression model creation processing, the second training data 430, which is the past manufacturing data of the second manufacturing device 310, is input to the second regression model creation processing unit 24. Then, based on the input second training data 430, the second regression model creation processing unit 24 repeats learning based on a data set including an explanatory variable (the second process data 431) and a criterion variable (the structure data 432), automatically interprets the correlation between the two, and creates the second regression model 452 as the resulting learned model, in the same manner as the first regression model creation processing unit 23 described above.

The second regression model creation processing unit 24 stores the created second regression model 452 in the storage unit 3. In the present embodiment, the second regression model creation processing unit 24 updates the second regression model 452 each time the second training data 430 is updated. However, it is not limited thereto. For example, the second regression model 452 may be updated at the time of executing the process estimation processing (described later), after learning the updated versions of the second training data 430 all together.

Third Regression Model Creation Processing Unit 25

The third regression model creation processing unit 25 performs third regression model creation processing to create a third regression model 453 representing a correlation between the first process data 411 and the second process data 431, based on the first regression model 451 and the second regression model 452.

Figure 5C:
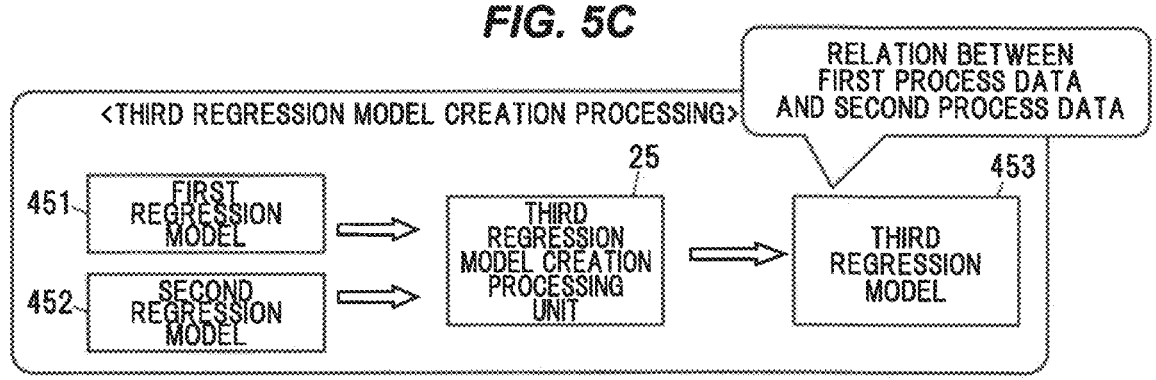

As shown in FIG. 5C, in the third regression model creation processing, the first regression model 451 and the second regression model 452 are input to the third regression model creation processing unit 25. Then, based on the first regression model 451 and the second regression model 452, the third regression model 453 representing the correlation between the first process data 411 and the second process data 431 is created through the structure data 412, 432 as an intermediary.

Figure 6A:
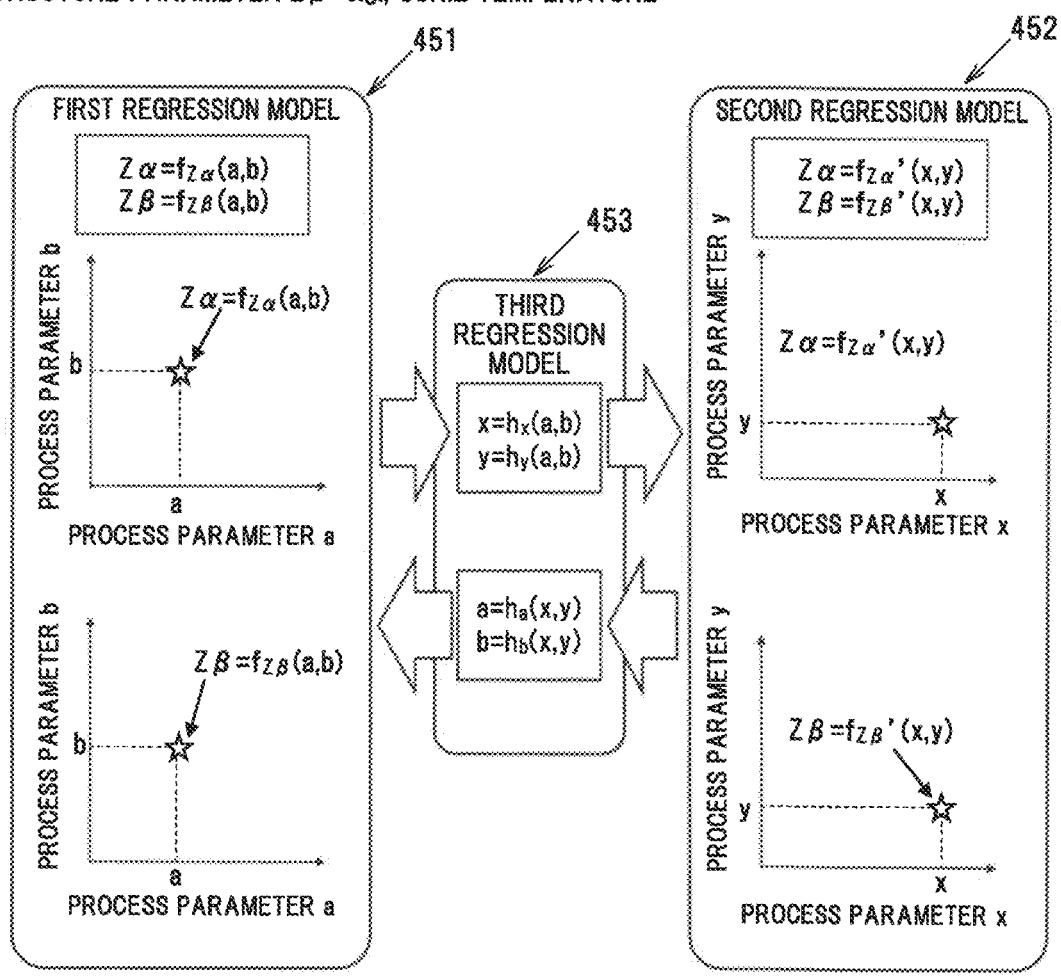
FIG. 6A is an explanatory diagram illustrating ways of using the process estimation device.

In more particular, referring to FIG. 6A, an example is explained using two kinds of structure parameters $Z\alpha$ and $Z\beta$. Here, $Z\alpha$ and $Z\beta$ represent, for example, the lattice volume of the main phase and the Curie temperatures Tc, respectively. As shown in FIG. 6A, assume that, e.g., a relationship between arbitrary structure parameters $Z\alpha$, $Z\beta$, that are different from each other, in the structure data 412 and process parameters a, b registered in the first process data 411 is expressed by $Z\alpha=f_{z\alpha}(a, b)$ and $Z\beta=f_{z\beta}(a, b)$ in the first regression model 451. Here, these equations represent that $f_{z\alpha}(a, b)$ and $f_{z\beta}(a, b)$ are mathematical models described using the process parameters a, b, respectively. In addition, assume that a relationship between the same structure parameters $Z\alpha$, $Z\beta$ in the structure data 432 and the process parameters x and y registered in the second process data 431 is expressed by $Z\alpha=f_{z\alpha}'(x, y)$ and $Z\beta=f_{z\beta}'(x, y)$ in the second regression model 452. Here, these equations represent that $f_{z\alpha}'(x, y)$ and $f_{z\beta}'(x, y)$ are mathematical models described using the process parameters x, y, respectively. Then, these four equations through the structure parameters $Z\alpha$, $Z\beta$ are arranged as an intermediary for the relationship between (a, b) and (x, y). Namely, in FIG. 6A, the process parameters (a, b) in the first process data 411 and the process parameters (x, y) in the second process data 412, for which the values of $Z\alpha$, $Z\beta$ are equal to each other, are correlated with each other based on experimental results under various conditions. According to this process, the third regression model 453 representing the correlation between the first process data 411 and the second process data 431 is obtained as $x=h_x(a, b)$ and $y=h_y(a, b)$, or as $a=h_a(x, y)$ and $b=h_b(x, y)$. Here, these equations represent that $h_x(a, b)$ and $h_y(a, b)$ are mathematical models described using the process parameters a, b, respectively, and that $h_a(x, y)$ and $h_b(x, y)$ are mathematical models described using the process parameters x, y, respectively. In this way, the third regression model creation processing unit 25 combines the first regression model 451 and the second regression model 452 and thereby creates the third regression model 453 representing the correlation between the first process data 411 and the second process data 431. Note that the items for the process parameters (a or b) in the first process data 411 and the process parameters (x or y) in the second process data 412 to be applied are not necessarily the same.

The third regression model creation processing unit 25 stores the created third regression model 453 in the storage unit 3. In the present embodiment, the third regression model creation processing unit 25 updates the third regression model 453 when any of the first regression model 451 and the second regression model 452 is updated. However, it is not limited thereto. For example, the third regression model 453 may be updated at the time of executing the process estimation processing (described later), after learning the updated versions of the second training data 430 all together.

Estimation Source-First Process Data Acquisition Processing Unit 26

The estimation source-first process data acquisition processing unit 26 performs estimation source-first process data acquisition processing (see FIG. 15) to acquire the estimation source-first process data 420 from the research site-side data management device 220. When receiving a process estimation request signal from the research site-side data management device 220, the estimation source-first process data acquisition processing unit 26 performs the estimation source-first process data acquisition processing. In the source-first process data acquisition processing, the estimation source-first process data acquisition processing unit 26 transmits an estimation source-first process data request signal to the research site-side data management device 220, receives the estimation source-first process data 420 transmitted from the research site-side data management device 220 in response to the request, and stores it in the storage unit 3.

Process Estimation Processing Unit 27

The process estimation processing unit 27 performs the process estimation processing (see FIG. 16) in which the second process data 431 (the estimated second process data 440) corresponding to the first process data 411 which is an arbitrary estimation source (the estimation source-first process data 420) is estimated using the third regression model 453.

Figure 5D:
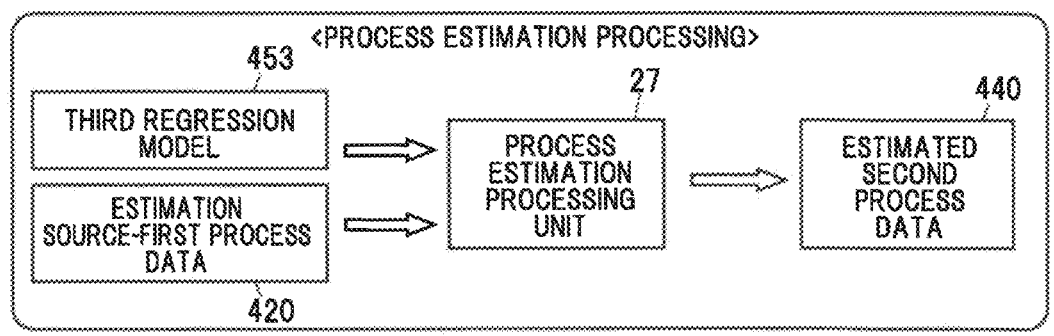

As shown in FIG. 5D, in the process estimation processing, the third regression model 453 and the estimation source-first process data 420 are input to the process estimation processing unit 27. The process estimation processing unit 27 obtains the second process data 431 corresponding to the estimation source-first process data 420 by using the third regression model 453 and sets the obtained second process data 431 as the estimated second process data 440. Then, the process estimation processing unit 27 stores the obtained estimated second process data 440 in the storage unit 3.

The estimated second process data 440 obtained here is the manufacturing conditions that allows the second manufacturing device 310 to reproduce the same material (ferrite magnet in this example) as that manufactured by the first manufacturing device 210 under the manufacturing conditions in the estimation source-first process data 420.

Estimated Second Process Data Transmission Processing Unit 28

The estimated second process data transmission processing unit 28 performs estimated second process data transmission processing (see FIG. 17) to transmit the estimated second process data 440 to the mass production site-side data management device 320.

Way of Using Process Estimation Device 1

Here, an example of a way of using the process estimation device 1 in the present embodiment will be described.

When a material with desired properties is successfully manufactured by one manufacturing device 210 (or 310), the process estimation device 1 can estimate process data (the estimated second process data 440 in this example) of the other manufacturing device 310 (or 210) based on process data (the estimation source-first process data 420 in this example) of the one manufacturing device 210 (or 310) if the third regression model 453 is created in advance between the two manufacturing devices 210 and 310. Then, by using the obtained process data (the estimated second process data 440 in this example) in manufacturing by the other manufacturing device 310 (or 210), a material with the same properties can be highly reproducibly manufactured.

Figure 6B:
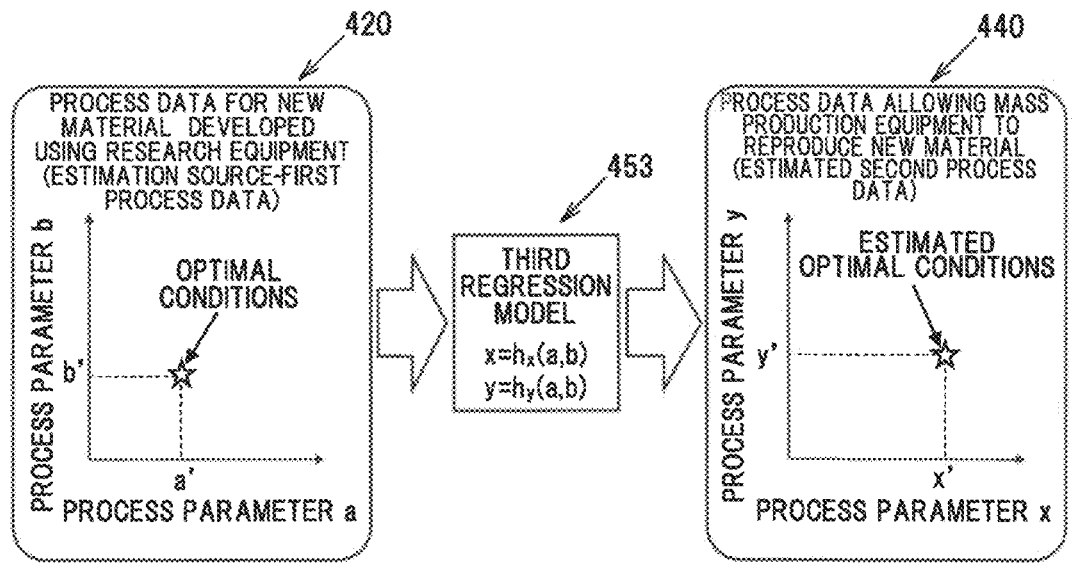
FIG. 6B is an explanatory diagram illustrating ways of using the process estimation device.

Here, assume that, as an example, a new material, which has never been manufactured by the second manufacturing device 310, is developed using the first manufacturing device 210 which is the research equipment, as shown in FIG. 6B. In this case, the second training data 430 related to the new material does not exist since the second manufacturing device 310 does not have any past manufacturing records, hence, the second regression model 452 for the new material does not exist. However, even in such a case, a process data allowing a mass production equipment to reproduce the new material (corresponding to the estimated second process data 440) corresponding to a process data for the new material developed using a research equipment (corresponding to the estimation source-first process data 420) can be estimated if the third regression model 453 is created in advance. In FIG. 6B, process parameters (x', y') of the estimated second process data 440 are obtained by applying the third regression model 453 to process parameters (a', b') registered in the estimation source-first process data 420. Here, the third regression model 453 is expressed as $x=h_x(a, b)$ and $y=h_y(a, b)$ that represent mathematical models $h_x(a, b)$ and $h_y(a, b)$ described using the process parameters a, b, respectively. In such an example, it is expected that the estimated second process data 440 obtained as a result of the estimation will be less accurate in a case where, e.g., raw materials which are significantly different from the past manufacturing data are used. However, it is possible to roughly estimate the manufacturing conditions in the second manufacturing device 310 which does not have past manufacturing records.

The second manufacturing device 310, which is the mass production equipment, manufactures a large amount of material, e.g., several tens of tons of material, per production run. For this reason, there is a demand to reduce the number of tests (the number of experiments) aimed at realizing mass production and to reduce waste as much as possible. According to the present embodiment, it is possible to estimate the roughly appropriate manufacturing conditions even for a new material, to reduce the number of tests to investigate the optimal manufacturing conditions for mass production and thereby to reduce the cost.

In this way, the configuration may be in such a manner that the first manufacturing device 210 is the research equipment and the second manufacturing device 310 is the mass production equipment, and to reproduce the material, which is manufactured by the research equipment, by the mass production equipment, the third regression model 453 is used and the second process data 431 for manufacturing the material to be reproduced by the mass production equipment is estimated from the first process data 411 from when the research equipment manufactured the material to be reproduced.

Use of Composition Data 414 in Machine Learning

To improve the estimation accuracy at the time of developing new materials as described above, it is more desirable that the first and second regression models 451 and 452 be created by taking into account the composition data 414 (see FIG. 4). In other words, it is more desirable that the first regression model 451 be created by machine-learning a relationship between the first process data 411, the structure data 412 and also the composition data 414 which includes composition information of the material. In this case, the first regression model 451 is created to represent a correlation between the first process data 411, the structure data 412 and the composition data 414. In addition, in this case, the composition data 414 needs to be included in the first training data 410.

Likewise, the second regression model 452 may be created by machine-learning a relationship between the second process data 431, the structure data 432 and also a composition data which includes a composition information of the material. In this case, the second regression model 452 is created to represent a correlation between the second process data 431, the structure data 432 and the composition data 414. In addition, in this case, the composition data 414 needs to be included in the second training data 430.

Correction of Estimated Second Process Data 440

In the development of new materials as described using FIG. 6B, the estimated second process data 440 is the roughly appropriate manufacturing conditions, hence, it can be configured to correct each parameter in the estimated second process data 440 by taking into account the results of subsequent manufacturing tests. That is, the process estimation device 1 may further includes a correction processing unit that corrects the estimated second process data 440 based on the test results from the manufacturing tests which are conducted using the second manufacturing device 310 according to the estimated second process data 440.

By including the correction processing unit, the second process data 431 (the estimated second process data 440) for the second manufacturing device 310, which corresponds to the first process data 411 (the estimation source-first process data 420) for the first manufacturing device 210, can be accurately estimated even in situations where, e.g., each of the regression models 451 to 453 does not fully corresponds to the new material (in a situation before mass production, where there are not enough data and machine learning has not been sufficiently performed). As a result, the material can be highly reproducibly manufactured by the mass production equipment, and the cost and the period from development to mass production can be reduced by reducing the number of manufacturing tests.

Other Way of Using Process Estimation Device 1

In present embodiment, the process data for the mass-production equipment is estimated from the process data for the research equipment. However, it is not limited thereto and, e.g., it is obviously possible to estimate the process data for the research equipment from the process data for the mass-production equipment in the opposite manner to the above. In this case, if, e.g., the third regression model 453 is created in advance between the mass-production equipment and the research equipment as shown in FIG. 6C, it is possible to estimate process data for the new material to be developed on the research equipment side (corresponding to the estimated second process data 440) which corresponds to process data allowing for mass production by the mass-production equipment (corresponding to the estimation source-first process data 420).

Figure 6C:
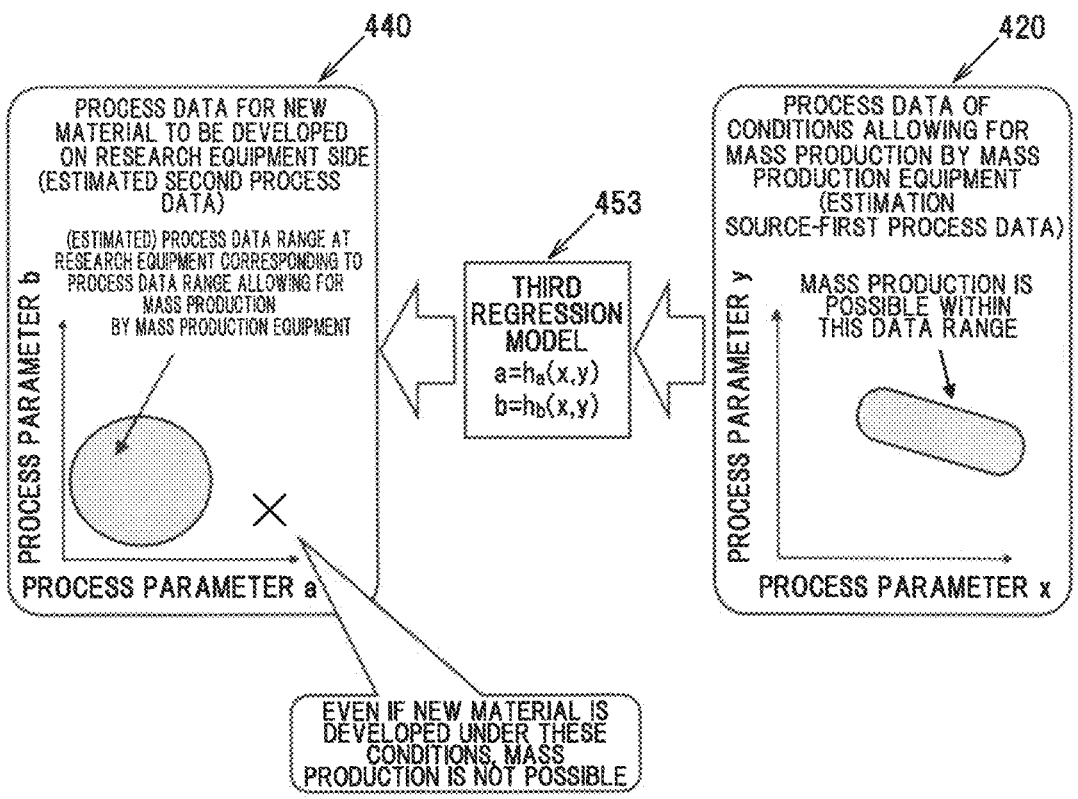
FIG. 6C is an explanatory diagram illustrating ways of using the process estimation device.

For example, even if a material is developed on the research equipment side, the development of the material may be wasted if the manufacturing conditions are conditions not allowing for mass production by the mass production equipment (e.g., the conditions indicated by x in FIG. 6C). When the process data for the new material to be developed on the research equipment side, which corresponds to the process data to be conditions allowing for mass production by the mass production equipment, is obtained as shown in FIG. 6C and the development is then conducted under manufacturing conditions (experimental conditions) within the range of the obtained process data, it is possible to develop materials without waste and without causing problems such as being unable to mass-produce.

In this way, the configuration may be in such a manner that the first manufacturing device 210 is the mass production equipment and the second manufacturing device 310 is the research equipment, the third regression model 453 is used and the second process data 431, which is to be experimental conditions in the research equipment and corresponds to the first process data 411 representing conditions allowing for mass production by the mass production equipment, is estimated from the first process data 411. In FIG. 6C, process parameters (a, b) of the estimated second process data 440 are obtained by applying the third regression model 453 to process parameters (x, y) registered in the estimation source-first process data 420. Here, the third regression model 453 is expressed as $a=h_a(x, y)$ and $b=h_b(x, y)$ that represent mathematical models $h_a(x, y)$ and $h_b(x, y)$ described using the process parameters x, y, respectively.

The first and second manufacturing devices 210 and 310 are not limited to the research equipment or the mass production equipment. The first and second manufacturing devices 210 and 310 may be, e.g., different production lines (manufacturing devices) in the same factory.

Process Estimation Method

Main Routine

Figure 7:
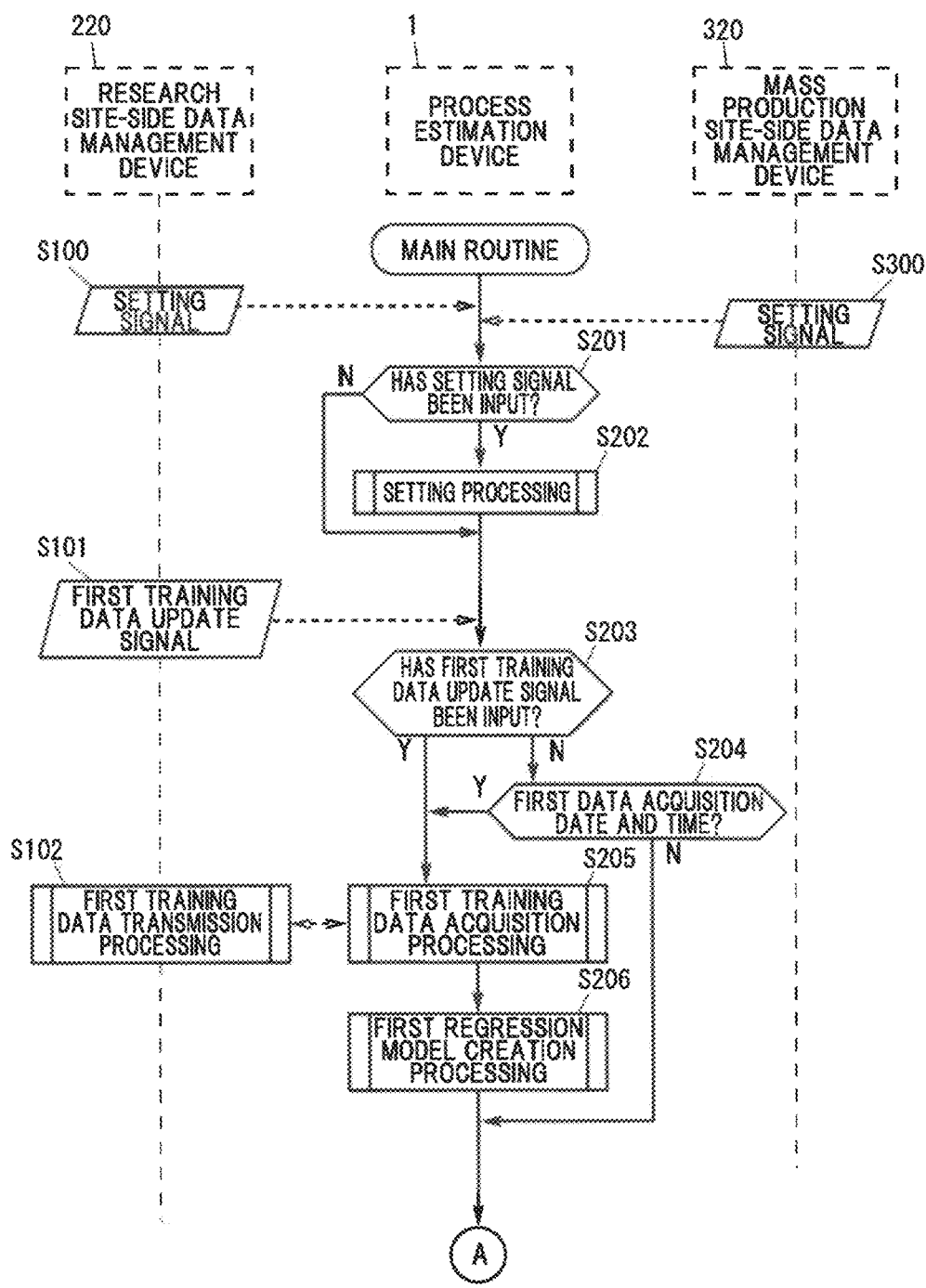
FIG. 7 is a flowchart showing a control flow of the process estimation method in the embodiment of the invention.
Figure 8:
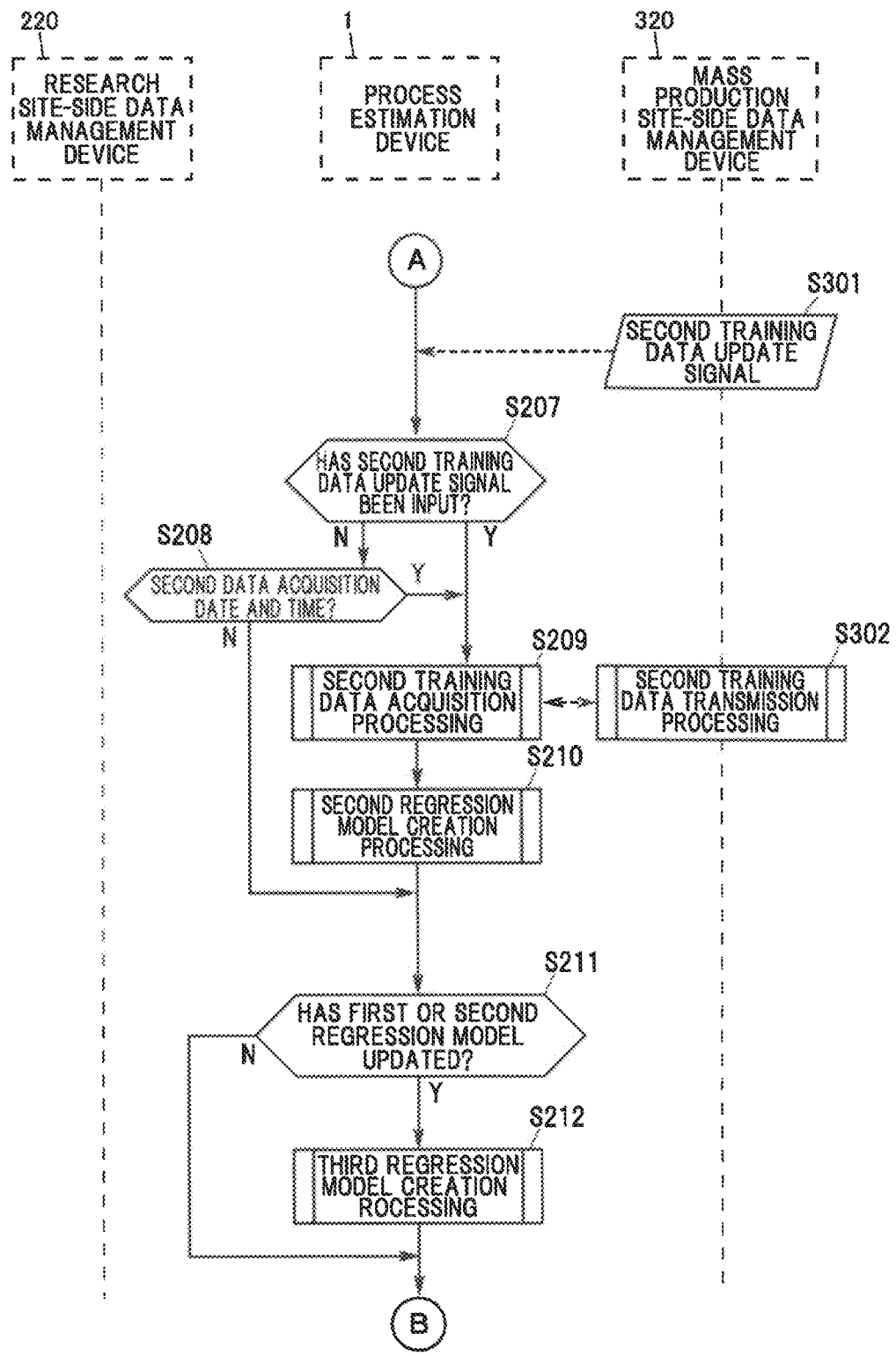
FIG. 8 is a flowchart showing the control flow of the process estimation method in the embodiment of the invention.
Figure 9:
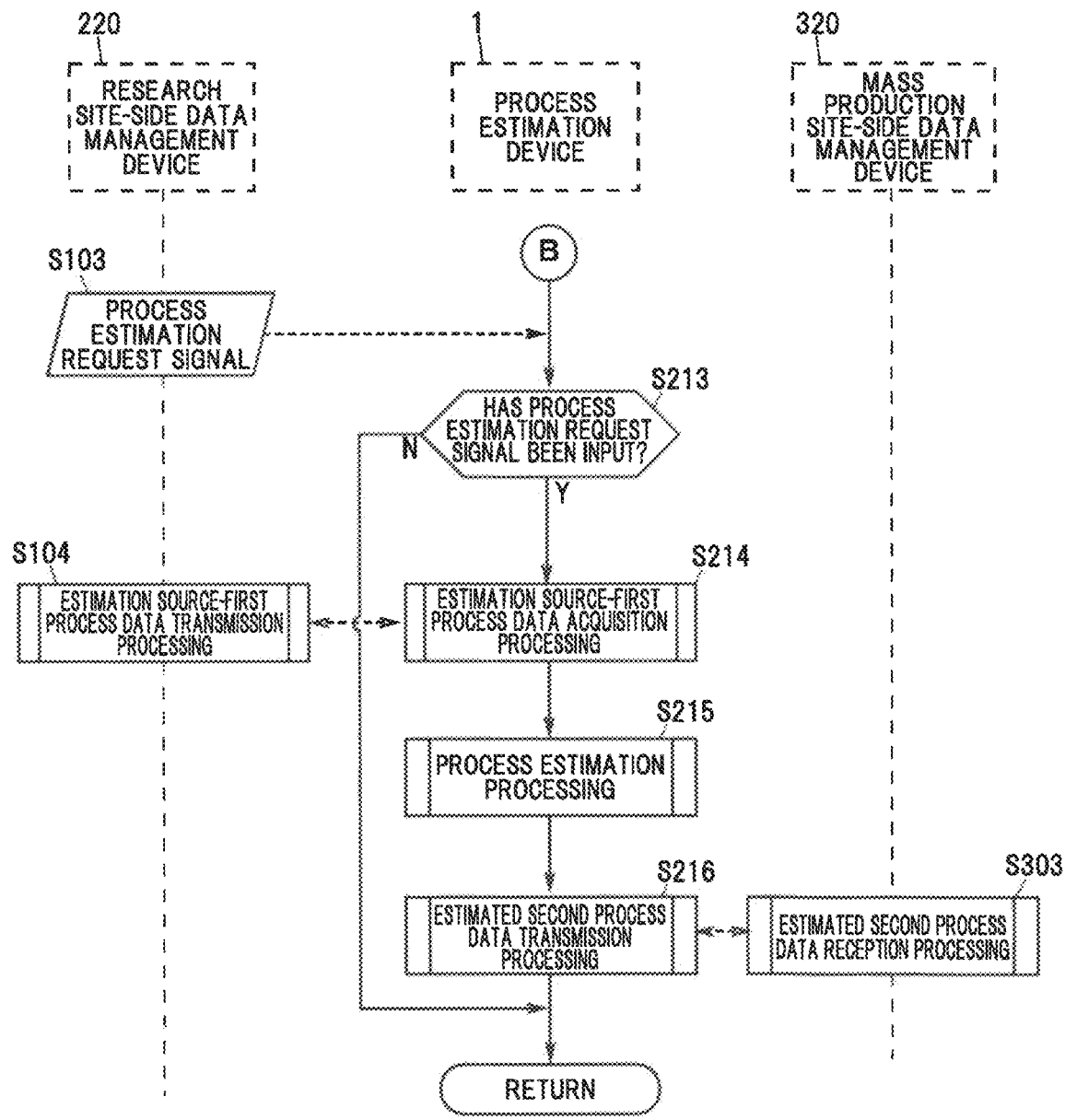
FIG. 9 is a flowchart showing the control flow of the process estimation method in the embodiment of the invention.

FIGS. 7 to 9 are flowcharts showing a control flow of the process estimation method in the present embodiment. In FIGS. 7 to 9, and also FIGS. 10 to 17 described later, the solid arrows indicate flow of control and the dashed arrows indicate input and output of signals or data.

As shown in FIG. 7, the research site-side data management device 220 transmits a setting signal to the process estimation device 1 when, e.g., configuring settings of the date and time to perform the first training data acquisition processing to acquire the first training data 410 (first data acquisition date and time), etc. (Step S100). Likewise, the mass production site-side data management device 320 transmits a setting signal to the process estimation device 1 when, e.g., configuring settings, etc., of the date and time to perform the second training data acquisition processing to acquire the second training data 430 (second data acquisition date and time) (Step S300).

When whether or not the setting signal has been input is determined and the determination made in Step S201 is YES (Y), the setting processing unit 21 of the process estimation device 1 performs the setting processing in Step S202. The details of the setting process will be described later. When the determination made in Step S201 is NO (N), the process proceeds to Step S203.

When the first training data 410 is updated, the research site-side data management device 220 transmits a first training data update signal to the process estimation device 1 (Step S101). In Step S203, the training data acquisition processing unit 22 of the process estimation device 1 determines whether or not the first training data update signal has been input. When the determination made in Step S203 is YES, the process proceeds to Step S205. When the determination made in Step S203 is NO, the training data acquisition processing unit 22 determines whether or not the current date and time is the first data acquisition date and time (Step S204). When the determination made in Step S204 is YES, the process proceeds to Step S205. When the determination made in Step S204 is NO, the process proceeds to Step S207 of FIG. 8.

In Step S205, the training data acquisition processing unit 22 performs the first training data acquisition processing. The first training data acquisition processing will be described later. After that, the first regression model creation processing unit 23 performs the first regression model creation processing in Step S206. The first regression model creation processing will be described later. After that, the process proceeds to Step S207 of FIG. 8.

When the second training data 430 is updated, the mass production site-side data management device 320 transmits a second training data update signal to the process estimation device 1 (Step S301), as shown in FIG. 8. In Step S207, the training data acquisition processing unit 22 of the process estimation device 1 determines whether or not the second training data update signal has been input. When the determination made in Step S207 is YES, the process proceeds to Step S209. When the determination made in Step S207 is NO, the training data acquisition processing unit 22 determines whether or not the current date and time is the second data acquisition date and time (Step S208). When the determination made in Step S208 is YES, the process proceeds to Step S209. When the determination made in Step S208 is NO, the process proceeds to Step S211.

In Step S209, the training data acquisition processing unit 22 performs the second training data acquisition processing. The second training data acquisition processing will be described later. After that, in Step S210, the second regression model creation processing unit 24 performs the second regression model creation processing. The second regression model creation processing will be described later. After that, the process proceeds to Step S211.

In Step S211, the third regression model creation processing unit 25 determines whether or not any of the first regression model 451 and the second regression model 452 has been updated. When the determination made in Step S211 is YES, the third regression model creation processing unit 25 performs the third regression model creation processing in Step S212. In the third regression model creation processing in Step S212, the third regression model 453 representing the correlation between the first process data 411 and the second process data 431 is created based on the first regression model 451 and the second regression model 452 which are stored in the storage unit 3, and the created third regression model 453 is stored in the storage unit 3. After that, the process proceeds to Step S213 of FIG. 9. When the determination made in Step S211 is NO, the process proceeds to Step S213 of FIG. 9 without performing the third regression model creation processing.

As shown in FIG. 9, when performing process estimation based on the estimation source-first process data 420 to estimate the corresponding estimated second process data 440, the research site-side data management device 220 transmits a process estimation request signal to the process estimation device 1. In Step S213, the estimation source-first process data acquisition processing unit 26 of the process estimation device 1 determines whether or not the process estimation request signal has been input. When the determination made in Step S213 is NO, the process returns. When the determination made in Step S213 is YES, the estimation source-first process data acquisition processing unit 26 performs the estimation source-first process data acquisition processing in Step S214. The estimation source-first process data acquisition processing will be described later.

After that, the process estimation processing unit 27 performs the process estimation processing in Step S215. After that, the estimated second process data transmission processing unit 28 performs the estimated second process data transmission processing in Step S216. The process estimation processing and the estimated second process data transmission processing will be described later. After that, the process returns.

Setting Processing

Figure 10:
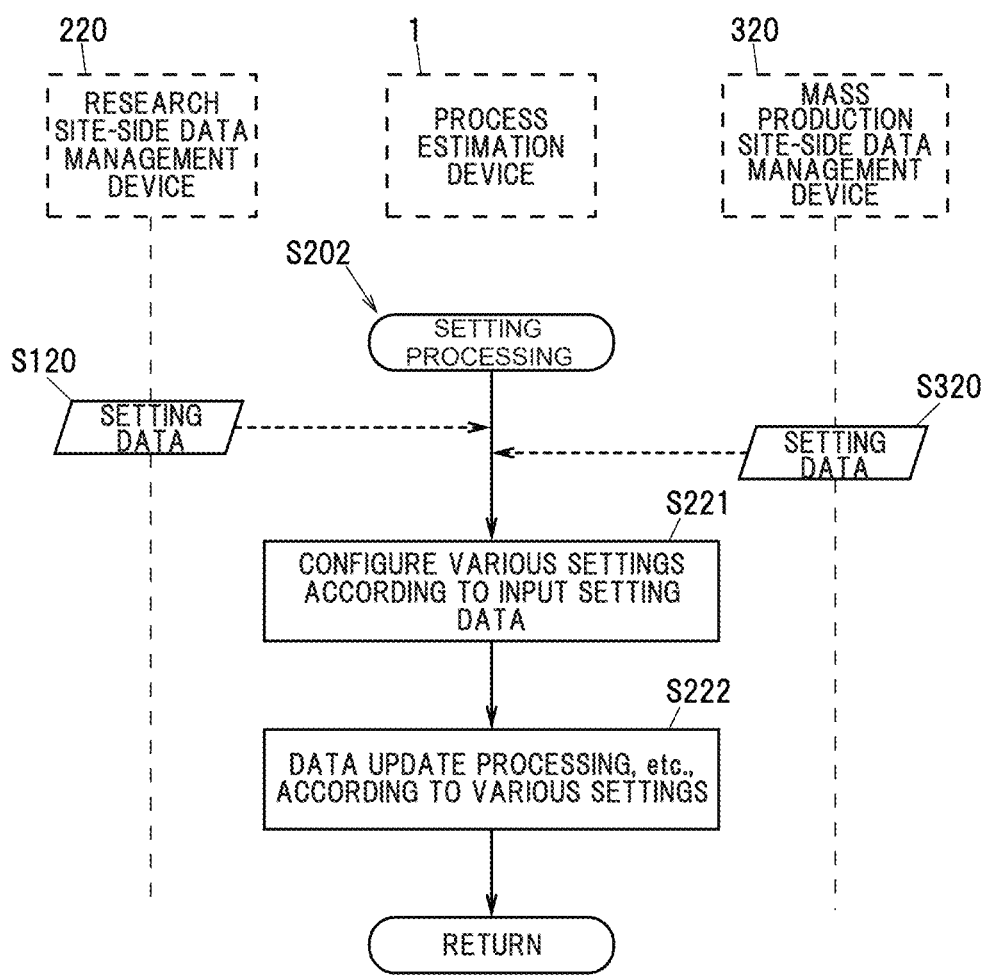
FIG. 10 is a flowchart showing a control flow of setting processing.

In the setting processing in Step S202, firstly, setting data input to the research site-side data management device 220 or the mass production site-side data management device 320 is transmitted to the process estimation device 1 (Step S120 or S320), as shown in FIG. 10. The setting processing unit 21 of the process estimation device 1 configures various settings according to the received setting data (step S221). Then, in accordance with the various settings in Step S221, appropriate processing such as data update processing is performed (Step S222), and the process returns.

First Training Data Acquisition Processing

Figure 11:
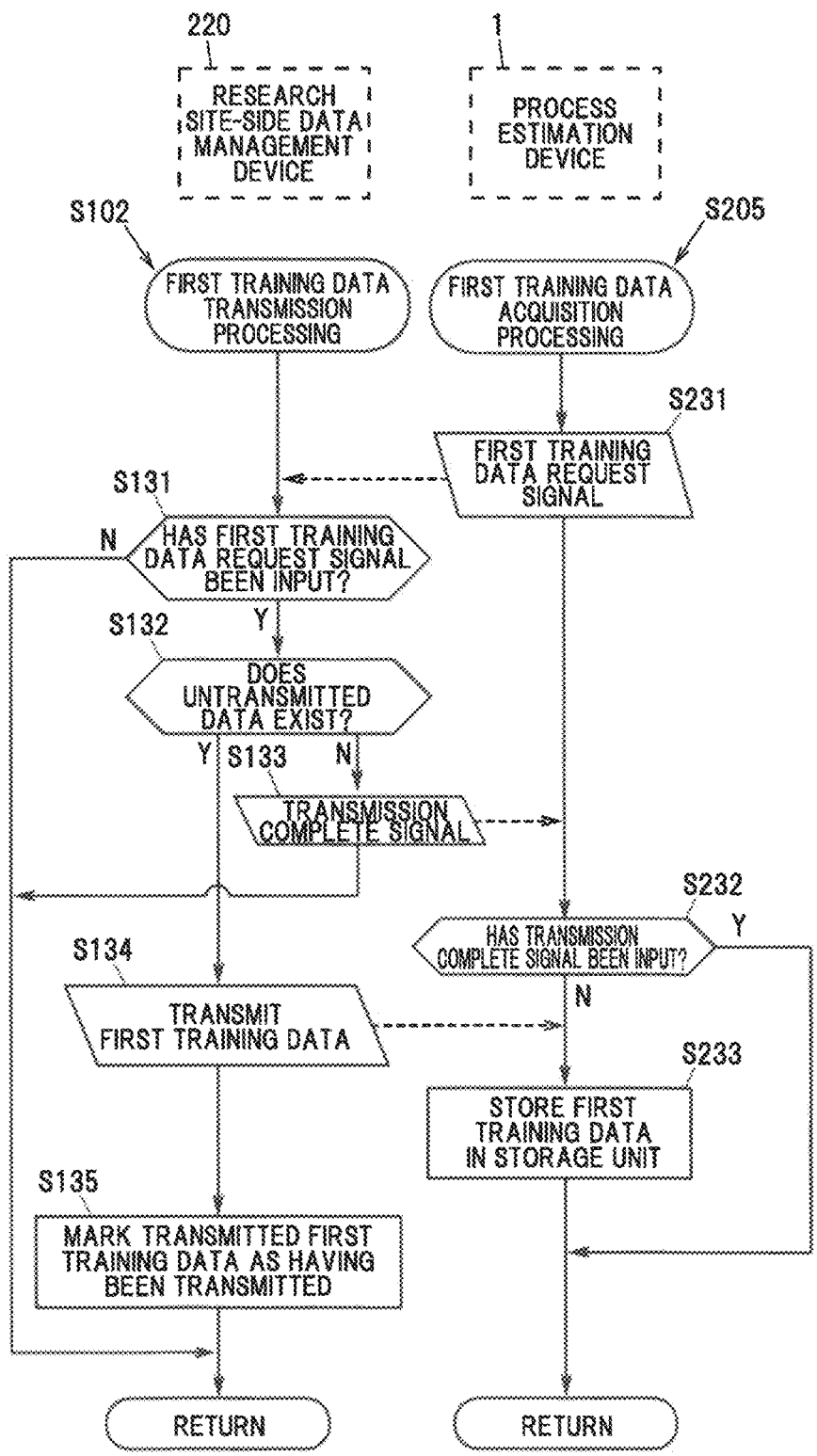
FIG. 11 is a flowchart showing a control flow of first training data acquisition processing and first training data transmission processing.

In the first training data acquisition processing in Step S205, firstly, the training data acquisition processing unit 22 of the process estimation device 1 transmits a first training data request signal to request the first training data 410 to the research site-side data management device 220 (Step S231), as shown in FIG. 11.

First training data transmission processing in the research site-side data management device 220 in Step S102 is performed in parallel with the first training data acquisition processing. In this first training data transmission processing, firstly, the research site-side data management device 220 determines whether or not the first training data request signal has been input from the process estimation device 1 (Step S131). When the determination made in Step S131 is NO, the process returns. When the determination made in Step S131 is YES, whether or not untransmitted (i.e., unsent) first training data 410 exists in the storage unit 222 is determined in Step S132. To identify whether the first learning data 410 has been transmitted or not, the identification can be performed by various methods, such as a method in which an identifier is added to the database, or a method in which the database is divided into transmitted data and untransmitted data and, when untransmitted first training data 410 is transmitted, this transmitted first training data 410 is integrated with the transmitted data in the database.

When the determination made in Step S132 is NO, a transmission complete signal is transmitted to the process estimation device 1 in Step S133 and the process then returns. When the determination made in Step S132 is YES, untransmitted first training data 410 (the first process data 411 and the structure data 412) is transmitted to the process estimation device 1 in Step S134. After that, in Step S135, the research site-side data management device 220 marks the transmitted first training data 410 as having been transmitted, and the process then returns. The transmitted first training data 410 may be appropriately processed, such as compressed, or deleted after a predetermined period of time, etc.

Returning to the first training data acquisition processing, after transmitting the first training data request signal in Step S231, the training data acquisition processing unit 22 determines whether or not the transmission complete signal has been input (Step S232). When the determination made in Step S232 is YES, the process returns since new first training data 410 does not exist.

When the determination made in Step S232 is NO, after receiving the first training data 410 from the research site-side data management device 220, the training data acquisition processing unit 22 stores the received first training data 410 in the storage unit 3 in Step S233. In the present embodiment, only transmission and reception of the first training data 410 marked as having been transmitted is performed. Therefore, in Step S233, the first training data 410 is updated by integrating the received first training data 410 with the first training data 410 stored in the storage unit 3. In Step S233, processing to extract only data required for machine learning, etc., may be appropriately performed. After that, the process returns.

First Regression Model Creation Processing

Figure 12:
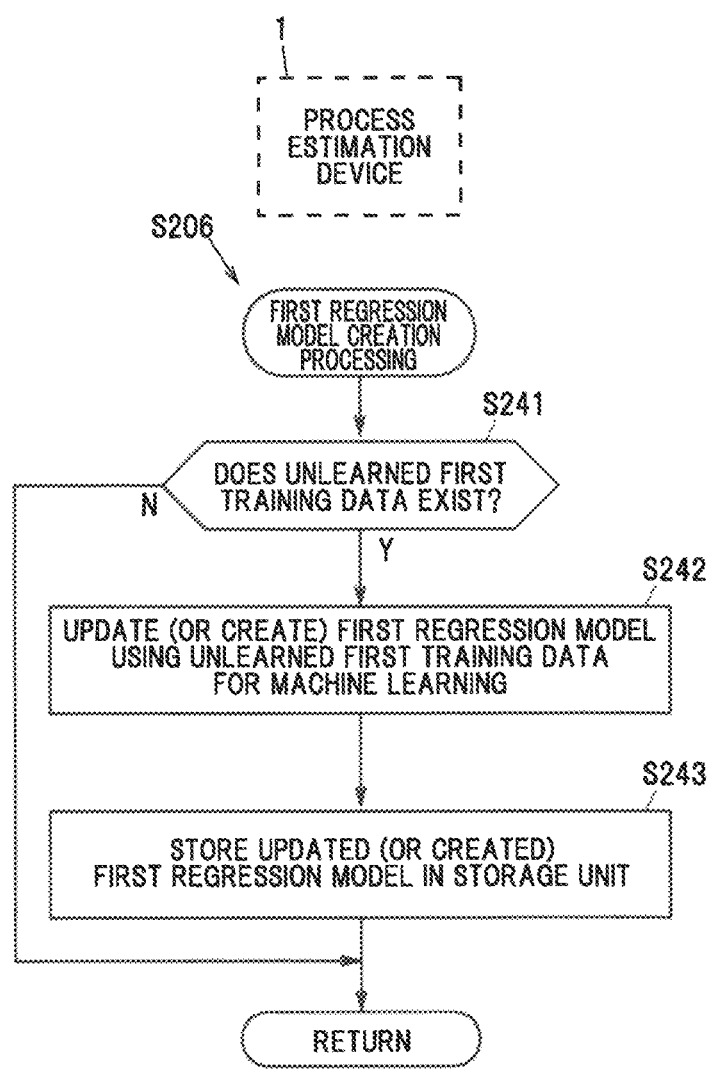
FIG. 12 is a flowchart showing a control flow of first regression model creation processing.

In the first regression model creation processing in Step S206, firstly, the first regression model creation processing unit 23 of the process estimation device 1 determines whether or not unlearned first training data 410 exists in the storage unit 3 (Step S241), as shown in FIG. 12. In other words, whether or not the first training data 410 has been updated is determined in Step S241. When the determination made in Step S241 is NO, the process returns. When the determination made in Step S241 is YES, the first regression model creation processing unit 23 updates the first regression model 451 using the unlearned first training data 410 for machine learning in Step S242. When the first regression model 451 has not yet been created, the first regression model 451 is newly created in Step S242. After that, the updated (or created) first regression model 451 is stored in the storage unit 3 in Step S243, and the process returns.

Second Training Data Acquisition Processing

In the second training data acquisition processing of Step S209, firstly, the training data acquisition processing unit 22 of the process estimation device 1 transmits a second training data request signal to request the second training data 430 to the mass production site-side data management device 320 (Step S251), as shown in FIG. 13.

Second training data transmission processing in the mass production site-side data management device 320 in Step S302 is performed in parallel with the second training data acquisition processing. In this second training data transmission processing, firstly, the mass production site-side data management device 320 determines whether or not the second training data request signal has been input from the process estimation device 1 (Step S351). When the determination made in Step S351 is NO, the process returns. When the determination made in Step S351 is YES, whether or not untransmitted second training data 430 exists in the storage unit 322 is determined in Step S352. To identify whether the second training data 430 has been transmitted or not, the identification can be performed by various methods, such as a method in which an identifier is added to the database, or a method in which the database is divided into transmitted data and untransmitted data and, when untransmitted second training data 430 is transmitted, this transmitted second training data 430 is integrated with the transmitted data in the database, in the same manner as the first training data 410 described above.

When the determination made in Step S352 is NO, a transmission complete signal is transmitted to the process estimation device 1 in Step S353 and the process then returns. When the determination made in Step S352 is YES, untransmitted second training data 430 (the second process data 431 and the structure data 432) is transmitted to the process estimation device 1 in Step S354. After that, in Step S355, the mass production site-side data management device 320 marks the transmitted second training data 430 as having been transmitted, and the process then returns. The transmitted second training data 430 may be appropriately processed, such as compressed, or deleted after a predetermined period of time, etc.

Returning to the second training data acquisition processing, after transmitting the second training data request signal in Step S251, the training data acquisition processing unit 22 determines whether or not the transmission complete signal has been input (Step S252). When the determination made in Step S252 is YES, the process returns since new second training data 430 does not exist.

When the determination made in Step S252 is NO, after receiving the second training data 430 from the mass production site-side data management device 320, the training data acquisition processing unit 22 stores the received second training data 430 in the storage unit 3 in Step S253. In the present embodiment, only transmission and reception of the second training data 430 marked as having been transmitted is performed. Therefore, in Step S253, the second training data 430 is updated by integrating the received second training data 430 with the second training data 430 stored in the storage unit 3. In Step S253, processing to extract only data required for machine learning, e.g., may be appropriately performed. After that, the process returns.

Second Regression Model Creation Processing

Figure 14:
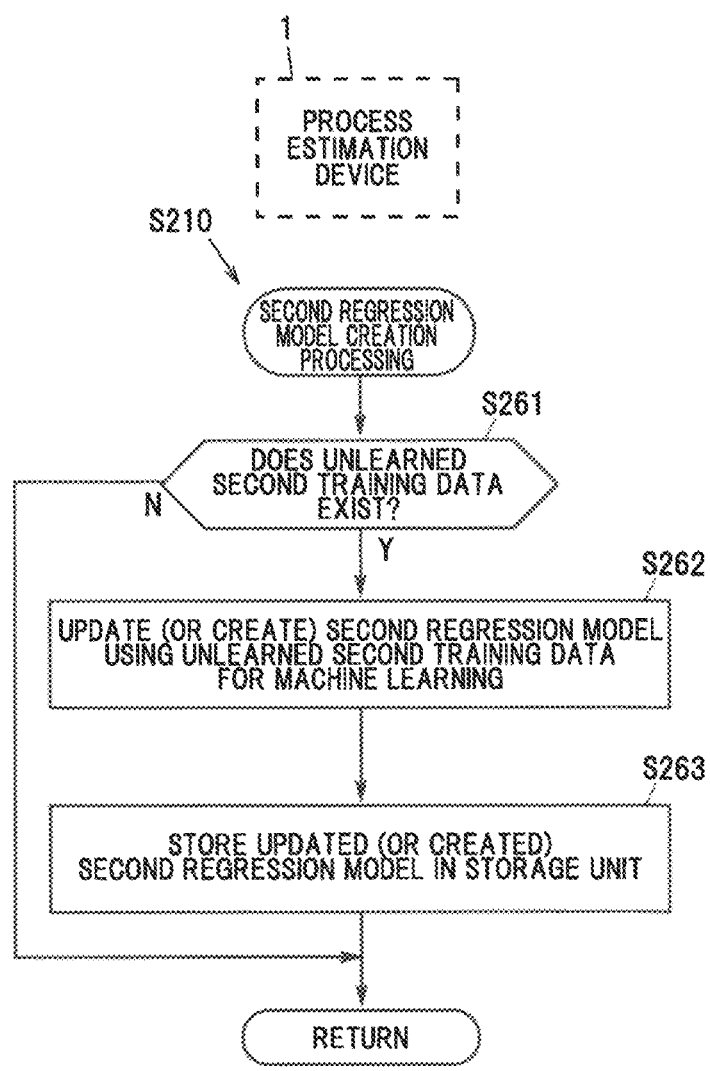
FIG. 14 is a flowchart showing a control flow of second regression model creation processing.

In the second regression model creation processing in Step S210, firstly, the second regression model creation processing unit 24 of the process estimation device 1 determines whether or not unlearned second training data 430 exists in the storage unit 3 (Step S261), as shown in FIG. 14. In other words, whether or not the second training data 430 has been updated is determined in Step S261. When the determination made in Step S261 is NO, the process returns. When the determination made in Step S261 is YES, the second regression model creation processing unit 24 updates the second regression model 452 using the unlearned second training data 430 for machine learning in Step S262. When the second regression model 452 has not yet been created, the second regression model 452 is newly created in Step S262. After that, the updated (or created) second regression model 452 is stored in the storage unit 3 in Step S263, and the process returns.

Estimation Source-First Process Data Acquisition Processing

Figure 15:
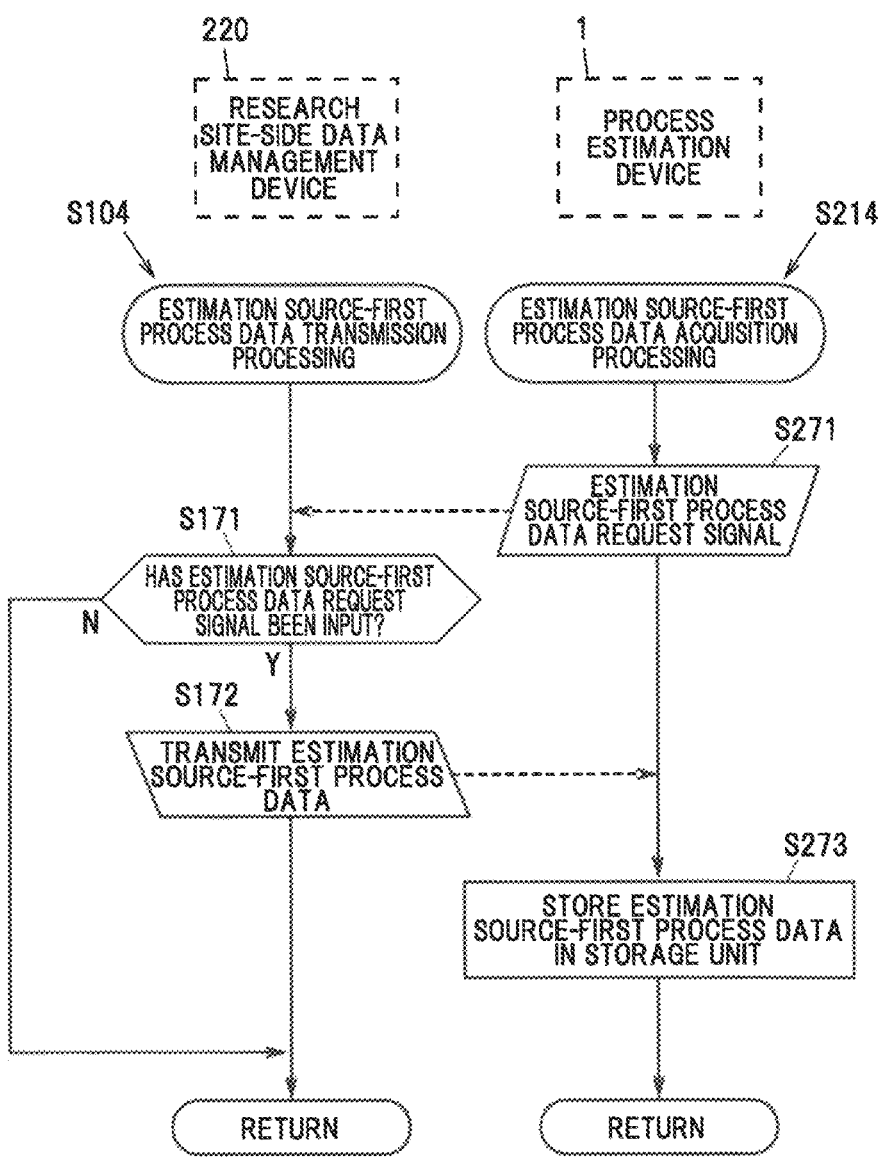
FIG. 15 is a flowchart showing a control flow of estimation source-first process data acquisition processing and estimation source-first process data transmission processing.

In the estimation source-first process data acquisition processing in Step S214, firstly, the estimation source-first process data acquisition processing unit 26 of the process estimation device 1 transmits an estimation source-first process data request signal to request the estimation source-first process data 420 to the research site-side data management device 220 (Step S271), as shown in FIG. 15.

Estimation source-first process data transmission processing in the research site-side data management device 220 in Step S104 is performed in parallel with the estimation source-first process data acquisition processing. In this estimation source-first process data transmission processing, firstly, the research site-side data management device 220 determines whether or not the estimation source-first process data request signal has been input from the process estimation device 1 (Step S171). When the determination made in Step S171 is NO, the process returns. When the determination made in Step S171 is YES, the research site-side data management device 220 transmits the estimation source-first process data 420 stored in the storage unit 222, to the process estimation device 1 in Step S172.

Returning to the estimation source-first process data acquisition processing, the estimation source-first process data acquisition processing unit 26 receives the estimation source-first process data 420 from the research site-side data management device 220 and stores the received estimation source-first process data 420 in the storage unit 3 in Step S273. After that, the process returns.

Process Estimation Processing

Figure 16:
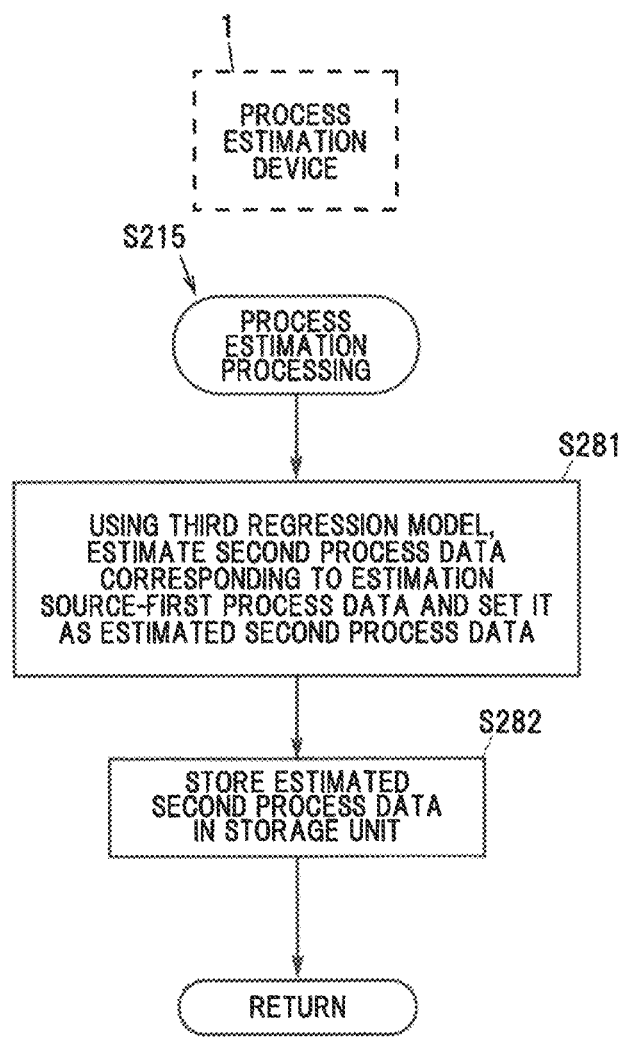
FIG. 16 is a flowchart showing a control flow of process estimation processing.

In the process estimation processing in Step S215, firstly, the process estimation processing unit 27 estimates the second process data 431 corresponding to the estimation source-first process data 420 by using the third regression model 453 and sets it as the estimated second process data 440 (Step S281), as shown in FIG. 16. After that, the obtained estimated second process data 440 is stored in the storage unit 3 in Step S282. After that, the process returns.

Estimated Second Process Data Transmission Processing

In the estimated second process data transmission processing in Step S216, firstly, the estimated second process data transmission processing unit 28 transmits the estimated second process data 440 to the mass production site-side data management device 320 (Step S291), as shown in FIG. 17.

Estimated second process data reception processing in the mass production site-side data management device 320 is performed in parallel with the estimated second process data transmission processing. In this estimated second process data reception processing, the mass production site-side data management device 320 receives the estimated second process data 440 transmitted from the process estimation device 1 and stores the received estimated second process data 440 in the storage unit 322 in Step S391. After that, the process returns.

After this estimated second process data transmission processing, the mass production site-side data management device 320 transmits the estimated second process data 440 to the second manufacturing device control device 330, even though it is not shown in the drawing. The second manufacturing device control device 330 gives manufacturing instructions according to the received estimated second process data 440 to the second manufacturing device 310 which thereby carries out manufacturing of the material according to the manufacturing instructions.

Functions and Effects of the Embodiment

As described above, in the process estimation method according to the present embodiment, a relationship between the first process data 411 and the structure data 412 obtained from a sample after the target step (the calcination step in this example) performed in the first manufacturing device 210 is machine-learned and the first regression model 451 representing the correlation between the first process data 411 and the structure data 412 is created, and also, a relationship between the second process data 431 and the structure data 432 obtained from a sample after the target step (the calcination step in this example) performed in the second manufacturing device 310 is machine-learned and the second regression model 452 representing the correlation between the second process data 431 and the structure data 432 is created, the third regression model 453 representing the correlation between the first process data 411 and the second process data 431 is created based on the first regression model 451 and the second regression model 452, and the second process data 431 (the estimated second process data 440) corresponding to the first process data 411 which is an arbitrary estimation source (the estimation source-first process data 420) is estimated using the third regression model 453.

As a result, e.g., a material developed using a small-scale manufacturing device for research and development can be manufactured with high reproducibility by a large-scale manufacturing device for mass production, and it is possible to significantly reduce the cost and significantly shorten the period until mass production by reducing the number of manufacturing tests. That is, in the present embodiment, it is possible to realize a process estimation method with which a material can be reproducibly manufactured even with different manufacturing devices.

Modification 1

Although the case where the first and second manufacturing devices 210, 310 are devices that manufacture a material through plural steps including a predetermined target step (the calcination step in this example) has been described in the present embodiment, it is not limited thereto. The first and second manufacturing devices 210, 310 should be devices that manufacture materials through not less than one step.

In addition, although the case where the process estimation device 1 does not belong to either the research site 200 or the mass production site 300 has been described in the present embodiment, the process estimation device 1 may belong to the research site 200 or the mass production site 300. In addition, when, e.g., the process estimation device 1 belongs to the research site 200, the research site-side data management device 220 and the process estimation device 1 may be configured as one unit. Furthermore, the research site-side data management device 220 may not belong to the research site 200, and the mass production site-side data management device 320 may not belong to the mass production site 300. In this case, for example, the research site-side data management device 220 and the mass production site-side data management device 320 may be realized by the same server. In addition, both the data management devices 220, 320 and the process estimation device 1 may be constructed from the same server.

In addition, although the case where the structure data analysis areas 240 and 340 are separately provided in the research site 200 and the mass production site 300 has been described in the present embodiment, a common structure data analysis area 240 and/or 340 may be used in both the research site 200 and the mass production site 300. In addition, in the case where both the research site 200 and the mass production site 300 have separate structure data analysis areas 240 and 340, the same device may be included in the structure data analysis areas 240 and 340. In other words, the two structure data analysis areas 240 and 340 may share one device.

Modification 2

In addition, devices to manufacture composite materials are applicable as the first manufacturing device 210 and the second manufacturing device 310 when the material to be manufactured is a composite material used for jackets of electric wires, etc. In more particular, the first manufacturing device 210 may include, e.g., a kneading machine to knead resin or rubber and filler, a pelletizer to pelletize the kneaded mixture, and a sheet forming machine to form the pellets into sheets. Composite materials can be manufactured as follows: resin or rubber and filler measured according to the blending ratio of the composite material are kneaded using the kneading machine such as a small kneader or a small twin-screw extruder, the kneaded material is pelletized by the pelletizer, and the obtained pellets are formed into sheets by the sheet forming machine.

When applied to the composite material described above, the structure data 412, 432 acquired in the structure data analysis areas 240, 340 preferably include information about the morphology between plural resins, between plural rubbers, or between a resin and a rubber, and the dispersion state of the filler. A scanning probe microscope (SPM) may be used for observation of the morphology between plural resins, between plural rubbers, or between a resin and a rubber. As the structure data 412 and 432, it is possible to use information obtained based on the form and distribution of each resin or rubber in the SPM image obtained by SPM, in particular, information of the shape, size, and area of the dispersed phase of each resin or rubber. Meanwhile, a scanning electron microscope (SEM) can be used for observation of the dispersion state of the filler, and information of the dispersion form of the resin or fillers dispersed in the resin in the SEM image obtained by SEM can be used as structure data.

SUMMARY OF THE EMBODIMENT

Technical ideas understood from the embodiment will be described below citing the reference signs, etc., used for the embodiment. However, each reference sign, etc., described below is not intended to limit the constituent elements in the claims to the members, etc., specifically described in the embodiment.

According to the first feature, a process estimation method is provided for estimating, based on a first process data 411 comprising a process information of a predetermined target step performed in a first manufacturing device 210 that manufactures a material through at least one step including the target step, a second process data 431 comprising a process information of the target step performed in a second manufacturing device 310 that is a different device from the first manufacturing device 210 and manufactures the material through at least one step including the target step, the method comprising: machine-learning a relationship between the first process data 411 and a structure data 412 obtained from a sample after the target step in the first manufacturing device 210, and creating a first regression model 451 representing a correlation between the first process data 411 and the structure data 412; machine-learning a relationship between the second process data 431 and a structure data 432 obtained from a sample after the target step in the second manufacturing device 310, and creating a second regression model 452 representing a correlation between the second process data 431 and the structure data 432; creating a third regression model 453 representing a correlation between the first process data 411 and the second process data 431 based on the first regression model 451 and the second regression model 452; and by using the third regression model 453, estimating an estimated second process data 440 that comprises the second process data 431 corresponding to an estimation source-first process data 420 comprising the first process data 411 that is an arbitrary estimation source.

According to the second feature, in the process estimation method as described by the first feature, the first regression model 451 is created by machine-learning a relationship between the first process data 411, the structure data 412 and also a composition data 414 comprising a composition information of the material so as to represent a correlation between the first process data 411, the structure data 412 and the composition data 414, and wherein the second regression model 452 is created by machine-learning a relationship between the second process data 431, the structure data 432 and also the composition data 414 comprising the composition information of the material so as to represent a correlation between the second process data 431, the structure data 432 and the composition data.

According to the feature the third feature, in the process estimation method as described by the first or second feature, the material comprises a ceramic material.

According to the fourth feature, in the process estimation method as described by the third feature, the material comprises a magnetic material.

According to the fifth feature, in the process estimation method as described by the third or fourth feature, the structure data 412, 432 comprises a feature amount based on temperature dependence of magnetization.

According to the sixth feature, in the process estimation method as described by any one of the third to fifth features, the target step comprises at least one of a mixing step, a calcination step, a fine grinding step, a molding step, and a sintering step.

According to the seventh feature, in the process estimation method defined by any one of the first to sixth features, the first manufacturing device 210 comprises a research equipment and the second manufacturing device 310 comprises a mass production equipment, wherein to reproduce the material, which is manufactured by the research equipment, by the mass production equipment, the third regression model 453 is used and the second process data 431 for manufacturing the material to be reproduced by the mass production equipment is estimated from the first process data 411 from when the research equipment manufactured the material to be reproduced.

According to the eighth feature, in the process estimation method as described by any one of the first to sixth features, the first manufacturing device 210 comprises a mass production equipment and the second manufacturing device 310 comprises a research equipment, and wherein the third regression model 453 is used and the second process data 431, which is to be experimental conditions in the research equipment and corresponds to the first process data 411 representing conditions allowing for mass production by the mass production equipment, is estimated from the first process data 411.

According to the ninth feature, a process estimation device 1 is configured to estimate, based on first process data 411 comprising a process information of a predetermined target step performed in a first manufacturing device 210 that manufactures a material through at least one step including the target step, a second process data 431 comprising a process information of the target step performed in a second manufacturing device 310 that is a different device from the first manufacturing device 210 and manufactures the material through at least one step including the target step, the process estimation device comprising: a first regression model creation processing unit 23 that machine-learns a relationship between the first process data 411 and a structure data 412 obtained from a sample after the target step in the first manufacturing device 210, and creates a first regression model 451 representing a correlation between the first process data 411 and the structure data 412; a second regression model creation processing unit 24 that machine-learns a relationship between the second process data 431 and a structure data 432 obtained from a sample after the target step in the second manufacturing device 310, and creates a second regression model 452 representing a correlation between the second process data 431 and the structure data 432; a third regression model creation processing unit 25 that creates a third regression model 453 representing a correlation between the first process data 411 and the second process data 431 based on the first regression model 451 and the second regression model 452; and a process estimation processing unit 27 that, by using the third regression model 453, estimates an estimated second process data 440 that comprises the second process data 431 corresponding to an estimation source-first process data 420 comprising the first process data 411 that is an arbitrary estimation source.

Although the embodiment of the invention has been described, the invention according to claims is not to be limited to the embodiment described above. Further, please note that not all combinations of the features described in the embodiment are necessary to solve the problem of the invention. In addition, the invention can be appropriately modified and implemented without departing from the gist thereof.

The invention claimed is:

1. A computer-performed process estimation method for estimating, based on a first process data comprising a process information of a predetermined target step performed in a first manufacturing device configured to manufacture a material through at least one step including the target step, a second process data comprising a process information of the target step performed in a second manufacturing device that is a different device from the first manufacturing device and configured to manufacture the material through at least one step including the target step, the method comprising:
   machine-learning a relationship between the first process data and a first structure data obtained from a sample after the target step in the first manufacturing device, and creating a first regression model representing a correlation between the first process data and the first structure data;
   machine-learning a relationship between the second process data and a second structure data obtained from a sample after the target step in the second manufacturing device, and creating a second regression model representing a correlation between the second process data and the second structure data;
   creating a third regression model representing a correlation between the first process data and the second process data based on the first regression model and the second regression model;
   by using the third regression model, estimating an estimated second process data that comprises the second process data corresponding to an estimation source-first process data comprising the first process data that is an arbitrary estimation source; and
   controlling the second manufacturing device based on the estimated second process data.

2. The computer-performed process estimation method according to claim 1, wherein the first regression model is created by machine-learning a relationship between the first process data, the first structure data and also a composition data comprising a composition information of the material so as to represent a correlation between the first process data, the first structure data and the composition data, and wherein the second regression model is created by machine-learning a relationship between the second process data, the second structure data and also the composition data comprising the composition information of the material so as to represent a correlation between the second process data, the second structure data and the composition data.

3. The computer-performed process estimation method according to claim 1, wherein the material comprises a ceramic material.

4. The computer-performed process estimation method according to claim 3, wherein the material comprises a magnetic material.

5. The computer-performed process estimation method according to claim 3, wherein each of the first structure data and the second structure data comprises a feature amount based on temperature dependence of magnetization.

6. The computer-performed process estimation method according to claim 3, wherein the target step comprises at least one of a mixing step, a calcination step, a fine grinding step, a molding step, and a sintering step.

7. The computer-performed process estimation method according to claim 1, wherein the first manufacturing device comprises a research equipment and the second manufacturing device comprises a mass production equipment, and wherein to reproduce the material, which is manufactured by the research equipment, by the mass production equipment, the third regression model is used and the second process data for manufacturing the material to be reproduced by the mass production equipment is estimated from the first process data from when the research equipment manufactured the material to be reproduced.

8. The computer-performed process estimation method according to claim 1, wherein the first manufacturing device comprises a mass production equipment and the second manufacturing device comprises a research equipment, and wherein the third regression model is used and the second process data, which is to be experimental conditions in the research equipment and corresponds to the first process data representing conditions allowing for mass production by the mass production equipment, is estimated from the first process data.

9. A process estimation device using a computer configured to estimate, based on a first process data comprising a process information of a predetermined target step performed in a first manufacturing device configured to manufacture a material through at least one step including the target step, a second process data comprising a process information of the target step performed in a second manufacturing device that is a different device from the first manufacturing device and configured to manufacture the material through at least one step including the target step, the device comprising:

a first regression model creation processing unit that machine-learns a relationship between the first process data and a first structure data obtained from a sample after the target step in the first manufacturing device, and creates a first regression model representing a correlation between the first process data and the first structure data;

a second regression model creation processing unit that machine-learns a relationship between the second process data and a second structure data obtained from a sample after the target step in the second manufacturing device, and creates a second regression model representing a correlation between the second process data and the second structure data;

a third regression model creation processing unit that creates a third regression model representing a correlation between the first process data and the second process data based on the first regression model and the second regression model; and a process estimation processing unit that, by using the third regression model, estimates an estimated second process data that comprises the second process data corresponding to an estimation source-first process data comprising the first process data that is an arbitrary estimation source, the device controlling the second manufacturing device based on the estimated second process data.

10. The process estimation device according to claim 9, wherein the first regression model is created by machine-learning a relationship between the first process data, the first structure data and also a composition data comprising a composition information of the material so as to represent a correlation between the first process data, the first structure data and the composition data, and wherein the second regression model is created by machine-learning a relationship between the second process data, the second structure data and also the composition data comprising the composition information of the material so as to represent a correlation between the second process data, the second structure data and the composition data.

11. The process estimation device according to claim 9, wherein the material comprises a ceramic material.

12. The process estimation device according to claim 11, wherein the material comprises a magnetic material.

13. The process estimation device according to claim 11, wherein each of the first structure data and the second structure data comprises a feature amount based on temperature dependence of magnetization.

14. The computer-performed process estimation method according to claim 11, wherein the target step comprises at least one of a mixing step, a calcination step, a fine grinding step, a molding step, and a sintering step.

15. The process estimation device according to claim 9, wherein the first manufacturing device comprises a research equipment and the second manufacturing device comprises a mass production equipment, and wherein to reproduce the material, which is manufactured by the research equipment, by the mass production equipment, the third regression model is used and the second process data for manufacturing the material to be reproduced by the mass production equipment is estimated from the first process data from when the research equipment manufactured the material to be reproduced.

16. The process estimation device according to claim 9, wherein the first manufacturing device comprises a mass production equipment and the second manufacturing device comprises a research equipment, and wherein the third regression model is used and the second process data, which is to be experimental conditions in the research equipment and corresponds to the first process data representing conditions allowing for mass production by the mass production equipment, is estimated from the first process data.

* * * * *